US012126100B2

(12) United States Patent
Shekhar et al.

(10) Patent No.: US 12,126,100 B2
(45) Date of Patent: Oct. 22, 2024

(54) APPARATUS FOR ELECTROMAGNETIC WAVE MANIPULATION

(71) Applicants: The University of British Columbia, Vancouver (CA); Regents of the University of California, Oakland, CA (US)

(72) Inventors: Sudip Shekhar, Vancouver (CA); Md Nazmul Hasan, Vancouver (CA); Dinesh Bharadia, San Diego, CA (US)

(73) Assignees: The Regents of the University of California, Oakland, CA (US); The University of British Columbia, Vancouver (CA)

(*) Notice: Subject to any disclaimer, the term of this patent is extended or adjusted under 35 U.S.C. 154(b) by 299 days.

(21) Appl. No.: 17/489,621

(22) Filed: Sep. 29, 2021

(65) Prior Publication Data

US 2022/0102863 A1 Mar. 31, 2022

Related U.S. Application Data

(60) Provisional application No. 63/084,726, filed on Sep. 29, 2020.

(51) Int. Cl.
*H01Q 3/44* (2006.01)
*H01Q 1/38* (2006.01)
(Continued)

(52) U.S. Cl.
CPC .............. *H01Q 9/0485* (2013.01); *H01Q 1/38* (2013.01); *H01Q 1/44* (2013.01)

(58) Field of Classification Search
CPC .......... H01Q 9/0485; H01Q 1/38; H01Q 1/44; H01Q 15/0086; H01Q 21/065; H01Q 3/44
See application file for complete search history.

(56) References Cited

U.S. PATENT DOCUMENTS 6,768,454 B2 7/2004 Kingsley et al.
7,466,269 B2 12/2008 Haziza
(Continued)

FOREIGN PATENT DOCUMENTS

CN 209248207 U 8/2019
CN 110380211 A 10/2019

OTHER PUBLICATIONS

Baldazzi, E. et al., "A High-Gain Dielectric Resonator Antenna with Plastic-Based Conical Horn for Millimeter-Wave Applications," IEEE Antennas and Wireless Propagation Letters (2020).
(Continued)

*Primary Examiner* — David E Lotter
(74) *Attorney, Agent, or Firm* — Mintz, Levin, Cohn, Ferris, Glovsky and Popeo, P.C.

(57) ABSTRACT

An electromagnetic wave manipulation apparatus may include a substrate integrated with a liquid crystal. For example, the substrate may include one or more cavities filled with the liquid crystal. Alternatively and/or additionally, the substrate may include one or more layers of material interposed with the liquid crystal. The liquid crystal may be subjected to a voltage bias that alters the dielectric constant of the liquid crystal. Doing so may introduce a corresponding field offset between the input signal and the output signal of the apparatus. Subjecting the liquid crystal to different voltage biases may give rise to a spatial phase gradient that enables the apparatus to perform a variety of electromagnetic wave transformations such as reflection, refraction, retro-reflection, amplification, and cancellation. By performing such transformations, the apparatus may change the radiation pattern of its output signal, thus steering its output signal towards or away from a receiver.

18 Claims, 34 Drawing Sheets

(51) Int. Cl.
*H01Q 1/44* (2006.01)
*H01Q 9/04* (2006.01)

(56) References Cited

U.S. PATENT DOCUMENTS 10,320,089 B2 6/2019 Jakoby et al.
2015/0236415 A1* 8/2015 Bily .................. H01Q 21/0012 342/372
2019/0146248 A1 5/2019 Wang et al.
2022/0179193 A1* 6/2022 Bevensee ............. G02B 26/085

OTHER PUBLICATIONS

Basar, E. et al., "Wireless Communications through Reconfigurable Intelligent Surfaces," IEEE Access 7, 116753-116773 (2019).
Karabey, O. H. et al., "Continuously Polarization Agile Antenna by Using Liquid Crystal-Based Tunable Variable Delay Lines," IEEE Transactions on Antennas and Propagation 61, 70-76 (2012).
Karabey, O. H., et al., A 2-D Electronically Steered Phased-Array Antenna with 2x2 Elements in LC Display Technology. IEEE Transactions on Microwave Theory and Techniques 60, 1297-1306 (2012).
Wong, A. M., et al., "Binary Huygens' Metasurfaces: Experimental Demonstration of Simple and Efficient Near-Grazing Retroreflectors for TE and TM Polarizations," IEEE Transactions on Antennas and Propagation 66, 2892-2903 (2018).

* cited by examiner

Reflected angle -1° Reflected angle -14° Reflected angle -44°

APPARATUS FOR ELECTROMAGNETIC WAVE MANIPULATION

RELATED APPLICATION

This application claims priority to U.S. Provisional Application No. 63/084,726 entitled "LIQUID CRYSTAL BASED RECONFIGURABLE DIELECTRIC RESONATOR ANTENNAS AND SMART SURFACES" and filed on Sep. 29, 2020, the disclosure of which is incorporated herein by reference in its entirety.

TECHNICAL FIELD

The subject matter described herein relates generally to wireless communication and more specifically to an apparatus for electromagnetic wave manipulations.

BACKGROUND

Antennas are transducers that convert electronic signals into electromagnetic (EM) waves and vice-versa. An antenna can be electrically excited by a transmission line, an aperture coupling, or wirelessly by another source of electromagnetic wave. One type of antenna is a patch antenna formed by mounting a first sheet of metal over a second sheet of metal serving as a ground plane. Patch antennas have a low profile and are thus suitable for mounting on a surface. However, patch antennas may be less efficient and exhibit higher than desirable return loss. A dielectric resonator antenna (DRA), which that includes a dielectric resonator disposed on top of another substrate in which the dielectric resonator is housed, may exhibit significantly lower losses than traditional metallic patch antennas. Nevertheless, conventional dielectric resonator antennas have limited beam steering capabilities. In particular, conventional dielectric resonator antennas exhibit a low quality factor (Q factor) at millimeter wave (mm-wave) frequencies.

SUMMARY

Systems, methods, and articles of manufacture, including computer program products, are provided for an apparatus for electromagnetic wave manipulation. In one aspect, there is provided an apparatus configured to generate an output electromagnetic wave responsive to an impinging electromagnetic wave. The apparatus may include: a substrate; and a liquid crystal (LC) integrated with the substrate, the liquid crystal exhibiting a first dielectric constant when subjected to a first voltage bias, the first dielectric constant of the liquid crystal transforming the impinging electromagnetic wave such that the output electromagnetic wave of the apparatus includes a first electromagnetic (EM) wave having a first field offset relative to the impinging electromagnetic wave impinging on the surface of the apparatus that corresponds to the first dielectric constant.

In some variations, one or more features disclosed herein including the following features can optionally be included in any feasible combination. The first voltage bias may be a fixed voltage, a variable voltage, or a zero voltage.

In some variations, the first voltage bias may be configurable by varying one or more of a thickness of the substrate, a thickness of the liquid crystal, a size of a radiator included in the apparatus, and/or a shape of the radiator.

In some variations, the apparatus may include one or more unit cells. Each unit cell may include a radiator and/or a cavity in the substrate filled with the liquid crystal.

In some variations, the apparatus may include a first unit cell and a second unit cell. The first unit cell may be subjected to the first voltage bias such that the liquid crystal comprising the first unit cell exhibits the first dielectric constant. The second unit cell may be subjected to a second voltage bias such that the liquid crystal comprising the second unit cell exhibits a second dielectric constant. The impinging electromagnetic wave may be further transformed by the output electromagnetic wave of the apparatus including a second electromagnetic wave having a second field offset relative to the impinging electromagnetic wave that corresponds to the second dielectric constant.

In some variations, the apparatus may beam steer the output electromagnetic wave through a constructive interference and/or a destructive interference between the first electromagnetic wave and the second electromagnetic wave. The beam steering may including changing a direction, a phase, and/or a polarization of the output electromagnetic wave.

In some variations, the apparatus may amplify the impinging electromagnetic wave when the output electromagnetic wave is formed by the constructive interference between the first electromagnetic wave and the second electromagnetic wave, and wherein the apparatus cancels the impinging electromagnetic wave when the output electromagnetic wave is formed by the destructive interference between the first electromagnetic wave and the second electromagnetic wave.

In some variations, the first field offset exhibited by the first electromagnetic wave may be configurable by varying the first voltage bias.

In some variations, the first field offset may include a change in a phase, an amplitude, a polarization, a delay, and/or a frequency of the impinging electromagnetic wave.

In some variations, the first voltage bias may change a permittivity of the liquid crystal to enable the apparatus to reflect, refract, retro-reflect, transmit, absorb, and/or polarize the impinging electromagnetic wave.

In some variations, the apparatus may modulate the output electromagnetic wave to encode data by at least varying the first field offset exhibited by the first electromagnetic wave.

In some variations, the apparatus may further include one or more of an electrode, a radio frequency (RF) trace, a direct current (DC) bias line, and a radiator.

In some variations, the liquid crystal may include one or more of a quartz, a twisted nematic liquid crystal, and a liquid crystal polymer.

In some variations, the substrate may include a dielectric material.

In another aspect, there is provided another apparatus configured to generate an output electromagnetic wave responsive to an impinging electromagnetic wave. The apparatus may include: a plurality of radiators; and a plurality of switches, wherein each radiator of the plurality of radiators is coupled with a switch from the plurality of switches, wherein biasing a first switch of the plurality of switches transforms the impinging electromagnetic wave by at least causing a first radiator coupled with the first switch to output a first electromagnetic wave having a first field offset relative to the impinging electromagnetic wave impinging on the surface of the apparatus, and wherein the output electromagnetic wave of the apparatus includes the first electromagnetic wave output by the first radiator.

In some variations, one or more features disclosed herein including the following features can optionally be included in any feasible combination. Biasing a second switch of the plurality of switches may cause a second radiator coupled with the second switch to output a second electromagnetic wave having a second field offset relative to the impinging electromagnetic wave impinging on the surface of the apparatus. The output electromagnetic wave of the apparatus may further include the second electromagnetic wave output by the second radiator.

In some variations, the apparatus may beam steer the output electromagnetic wave through a constructive interference and/or a destructive interference between the first electromagnetic wave and the second electromagnetic wave. The beam steering may include changing a direction, a phase, and/or a polarization of the output electromagnetic wave.

In some variations, the first radiator and the second radiator may be connected in parallel by the biasing of the first switch and the second switch.

In some variations, an operating frequency of the apparatus may correspond to a quantity of the plurality of radiators connected in parallel by biasing a corresponding plurality of switches. A reflection coefficient and a transmission phase of the apparatus may correspond to the operating frequency of the apparatus.

In some variations, the plurality of switches may include one or more of a varactor and a liquid crystal.

In some variations, the apparatus may modulate the output electromagnetic wave to encode data by at least varying the first field offset exhibited by the first electromagnetic wave.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an apparatus for electromagnetic wave manipulation, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
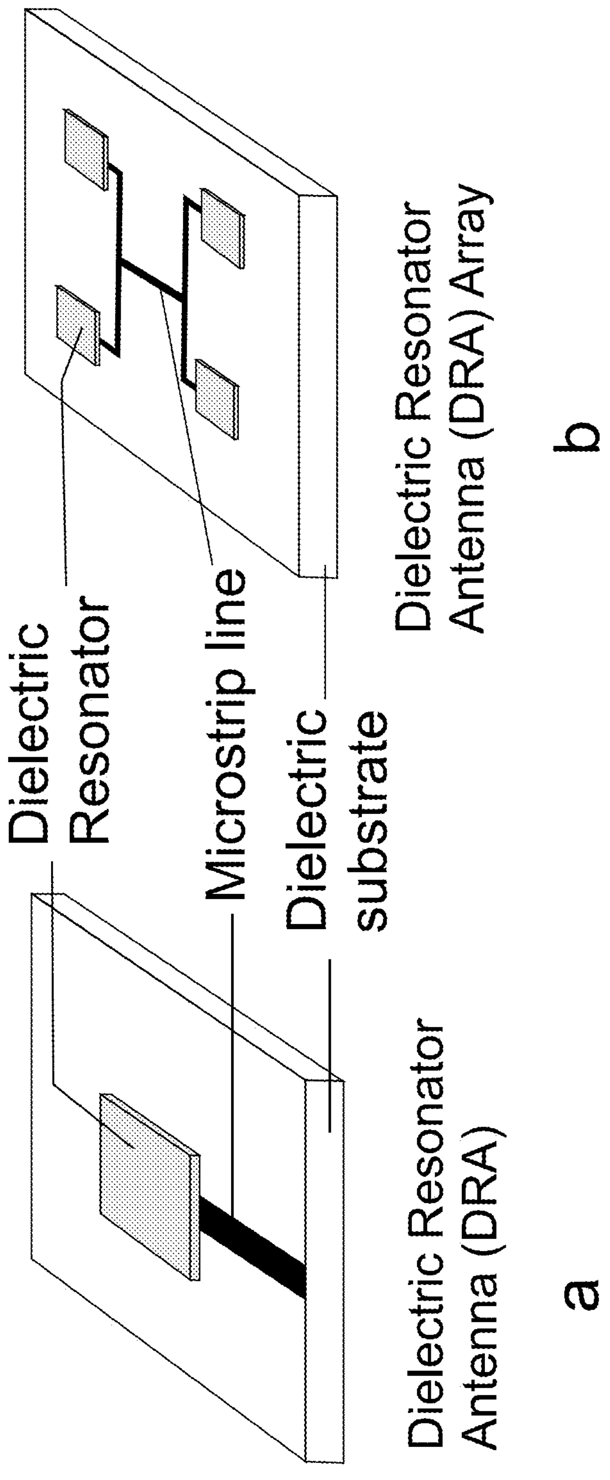
FIG. 1 depicts an example of a dielectric resonator antenna with an antenna array, in accordance with some example embodiments.
Figure 2:
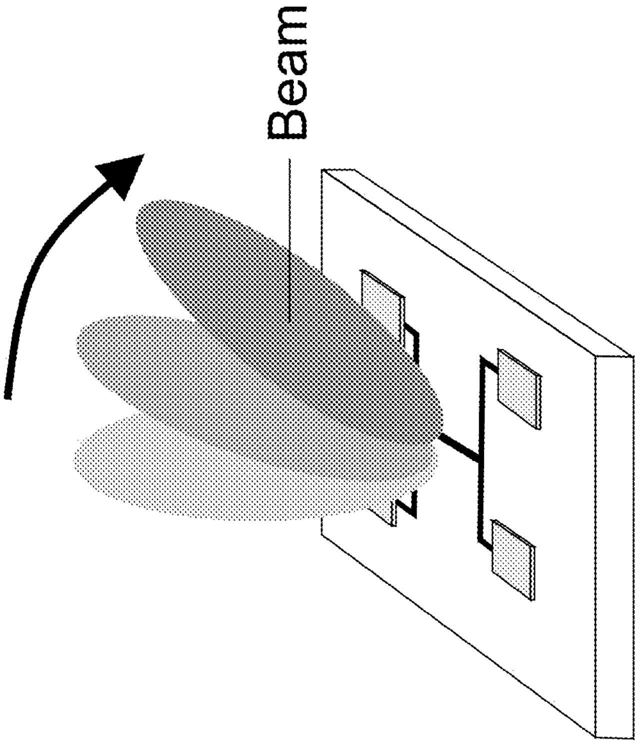
FIG. 2 depicts a schematic diagram illustrating an example of antenna beam-steering, in accordance with some example embodiments.

A dielectric resonator antenna (DRA) includes a dielectric resonator disposed on top of another substrate in which the dielectric resonator is housed. FIG. 1(*a*) depicts an example of a dielectric resonator antenna, in accordance with some example embodiments. As shown in FIG. 1(*b*), multiple dielectric resonator antennas may be configured in a periodic arrangement to form an antenna array. Each dielectric resonator antenna in the antenna array may produce electromagnetic radiation in a certain direction. This electromagnetic radiation, technically called a "beam," may be vectorially summed across each dielectric resonator antenna in the antenna array. Moreover, the resultant beam may be steered either by moving the antenna array mechanically, as in the case of large space-antenna arrays, or electronically as in the case of electronic antenna arrays. An illustrative description of the beam-steering is shown in FIG. 2, where the beam of the antenna array changes direction (marked by an arrow). Electronic beam-steering may be accomplished with phased array antennas, in which the direction of the resultant beam is proportional to the imparted phase of the excitation signal from the individual dielectric resonator antennas in the antenna array.

Figure 3:
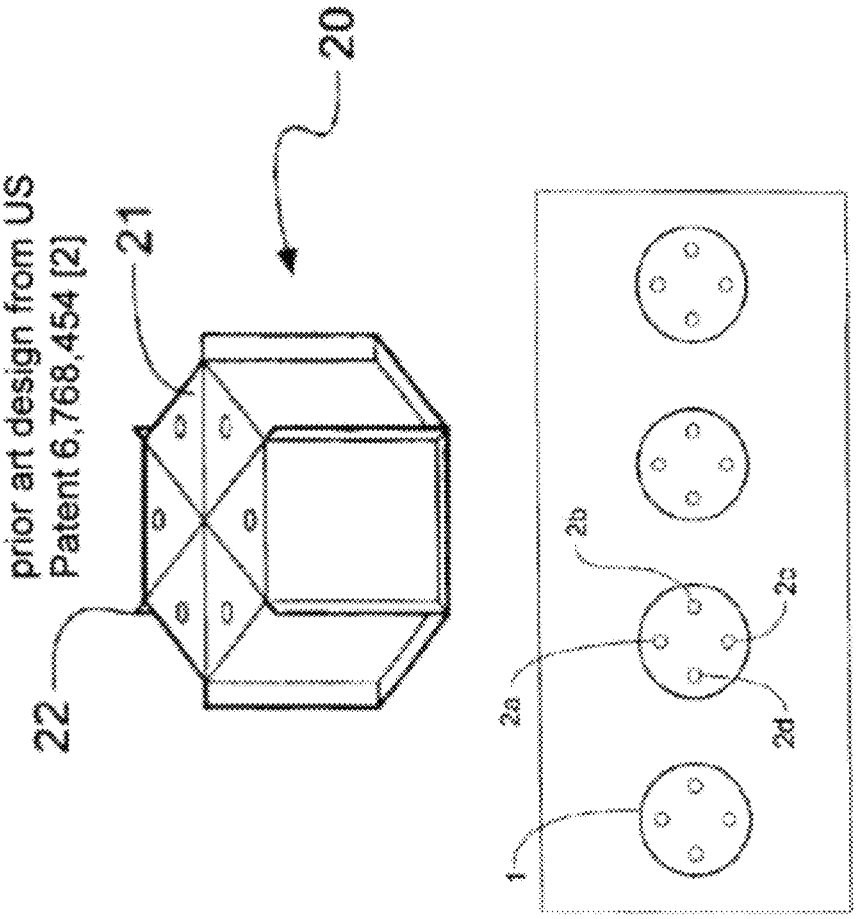
FIG. 3 depicts an example of a conventional dielectric resonator antenna and a conventional dielectric resonator antenna array, in accordance with some example embodiments.

Despite exhibiting significantly lower losses than traditional metallic patch antennas, conventional dielectric resonator antennas (and antenna arrays formed therefrom) have limited beam steering capabilities. For example, FIG. 3 depicts a conventional dielectric resonator antenna and a conventional dielectric resonator antenna array, which rely on diodes and bulky electromagnet ferrite based phase shifters. However, with limited beam steering capabilities, conventional dielectric resonator antennas (and the antenna arrays formed therefrom) tend to perform poorly, especially at millimeter wave (mm-wave) frequencies. As such, various implementations of the present disclosure include an electromagnetic wave manipulation apparatus with beam-steering capabilities at the microwave, millimeter-wave, and terahertz (THz) frequencies. In some example embodiments, the electromagnetic wave manipulation apparatus may include a substrate, such as a dielectric substrate and/or the like, that incorporates a liquid crystal material. The local dielectric constant of the electromagnetic wave manipulation apparatus may be tuned by applying an electrical voltage bias to the liquid crystal material. Doing so may change the permittivity of the liquid crystal material to an impinging electromagnetic wave, thus enabling the electromagnetic wave manipulation apparatus to perform a variety of electromagnetic wave transformations including, for example, reflection, refraction, retro-reflection, transmission, absorption, polarization conversion, and/or the like.

In some example embodiments, the electromagnetic wave manipulation apparatus may be a resonator antenna array in which a liquid crystal material is disposed inside the cavities of a substrate such as a dielectric substrate and/or the like. Biasing the liquid crystal with different electrical voltage biases may create local variations in the dielectric constant of the substrate. Alternatively, the electromagnetic wave manipulation apparatus may be smart surface of any geometrical shape formed by interposing a liquid crystal material between two metasurfaces. The metasurfaces may include one or multiple layers of a rigid or flexible material including, for example, a metallic material, a dielectric material, and/or the like. The electromagnetic wave manipulation apparatus may incorporate a variety of liquid crystal material including, for example, quartz, liquid crystal polymer (LCP), nematic liquid crystal, and/or the like. The sandwiched liquid crystal layer can be contained within another dielectric such as quartz, liquid crystal polymer (LCP), etc. By using multiple electrodes to provide electrical voltage bias to tune the local dielectric constant of the liquid crystal layer, a phase gradient can be engineered spatially across the surface of the electromagnetic wave manipulation apparatus. This phase gradient may enable the electromagnetic wave manipulation apparatus to perform a variety of electromagnetic wave transformations including, for example, reflection, refraction, retro-reflection, amplification, cancellation, transmission, absorption, polarization conversion and/or the like.

Figure 4A:
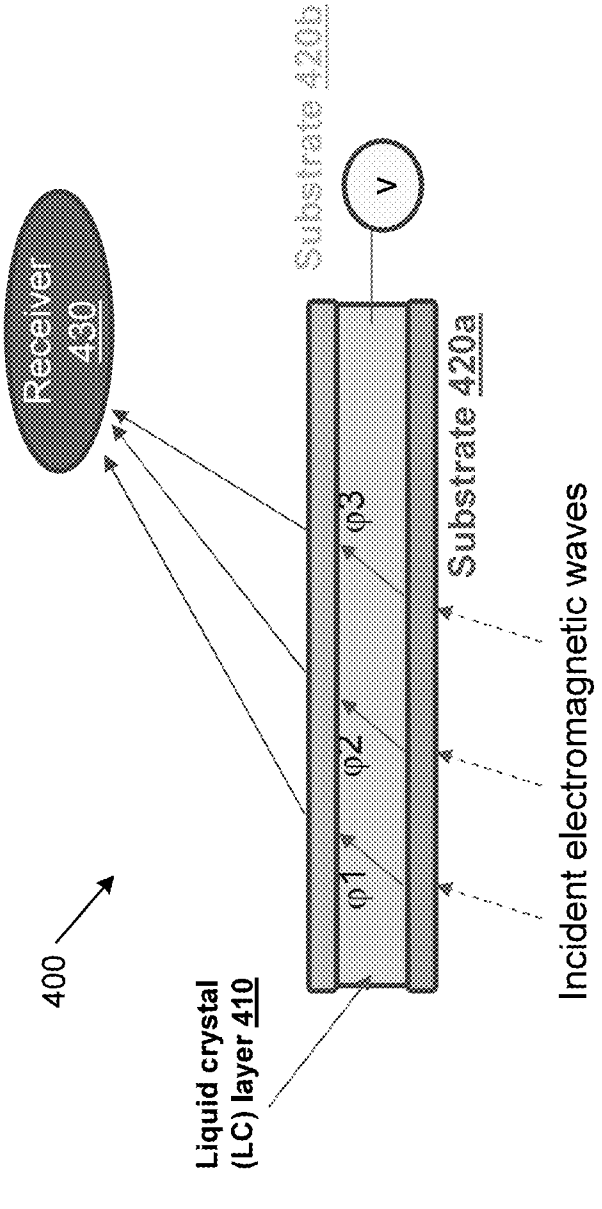
FIG. 4A depicts a schematic diagram illustrating a cross sectional view of an example of an electromagnetic wave manipulation apparatus, in accordance with some example embodiments.
Figure 4B:
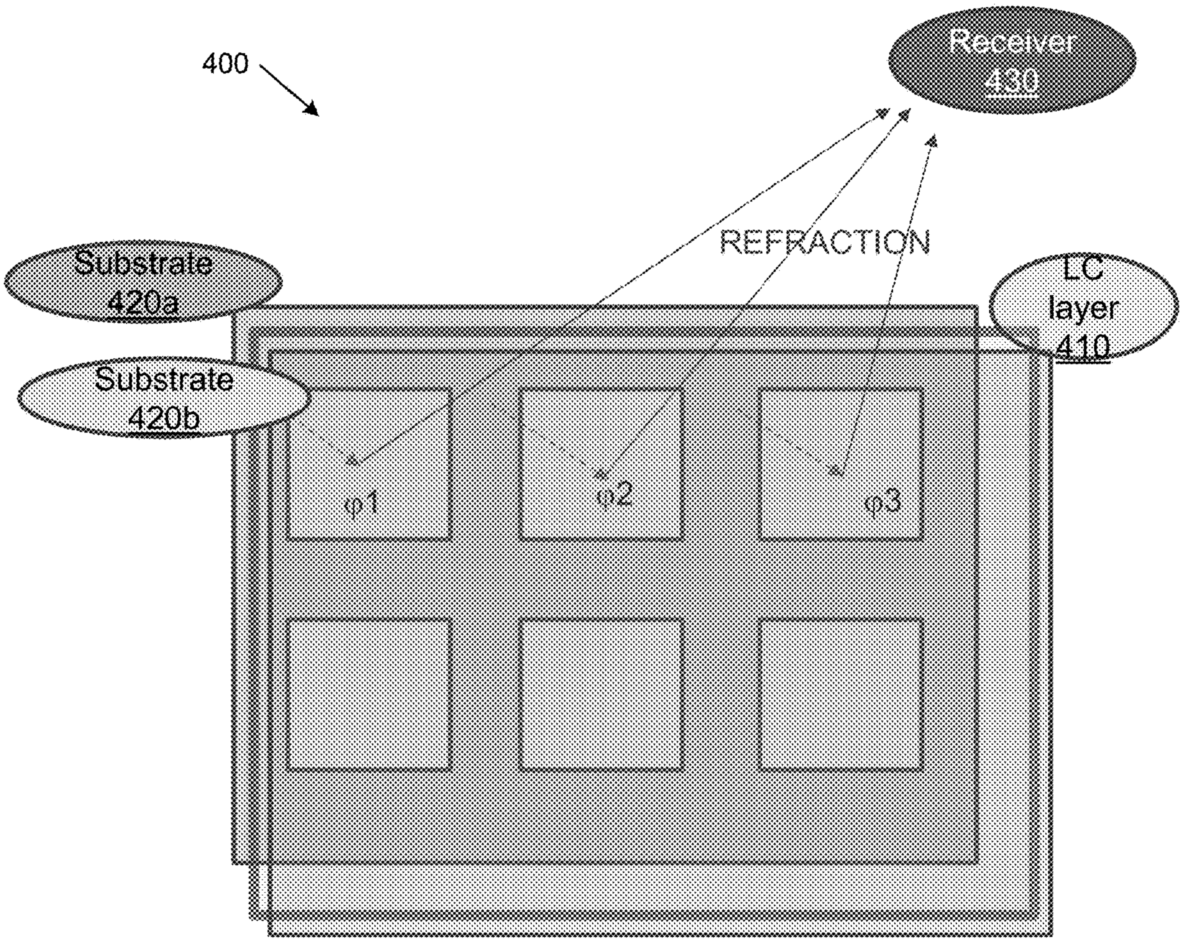
FIG. 4B depicts a schematic diagram illustrating a top view of an example of an electromagnetic wave manipulation apparatus, in accordance with some example embodiments.
Figure 6:
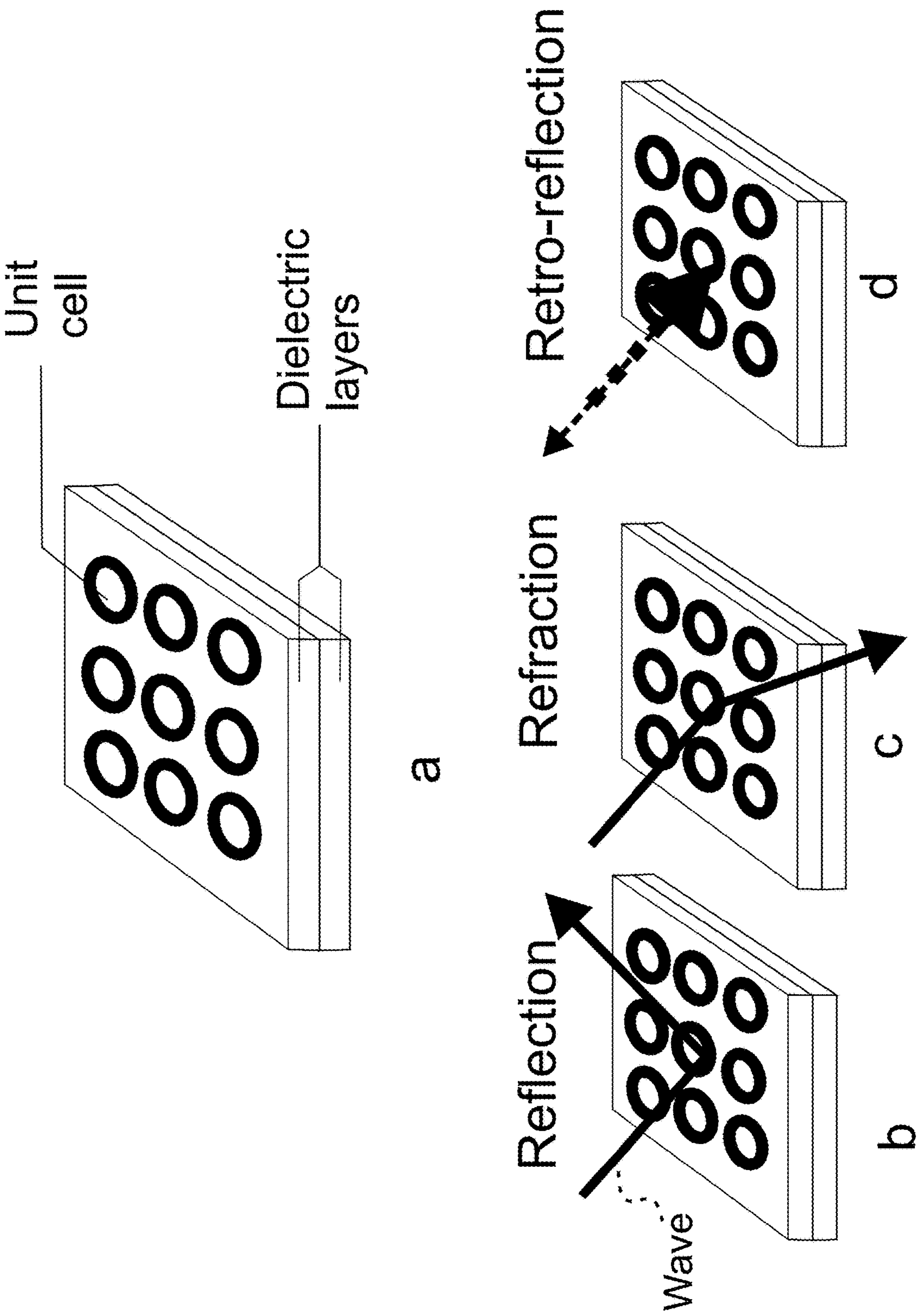
FIG. 6 depicts an example of a multi-layer metasurface with unit cell elements and various electromagnetic wave transformations, in accordance with some example embodiments.

FIGS. 4A-B depict schematic diagrams illustrating an example of an electromagnetic wave manipulation apparatus 400, in accordance with some example embodiments. Referring to FIGS. 4A-B, the electromagnetic wave manipulation apparatus 400 may include a liquid crystal (LC) layer 410 interposed between a first substrate 420*a* and a second substrate 420*b*. The dielectric constant of the liquid crystal layer 410 may be tuned by applying an electrical voltage bias to the liquid crystal layer 410. Doing so may change the permittivity of the liquid crystal layer 410 to the impinging electromagnetic waves, thus enabling the electromagnetic wave manipulation apparatus 400 to perform a variety of electromagnetic wave transformations including, for example, reflection, refraction, retro-reflection, and/or the like. Three such transformations—reflection, refraction, and retro-reflection—are illustrated in FIGS. 6(*b*), 6(*c*), and 6(*d*), respectively. As shown in FIG. 6(*b*), reflection occurs when the electromagnetic wave is reflected at an angle corresponding to the permittivity of the liquid crystal layer 410. Meanwhile, FIG. 6(*c*) shows that refraction occurs when the electromagnetic wave penetrates a surface and exits at a different angle than the angle of incidence. As shown in FIG. 6(*d*), retro-reflection occurs when the electromagnetic wave is returned back with the same angle of incidence and in the same direction from which the electromagnetic wave originated. It should be appreciated that the angle at which an impinging electromagnetic wave is reflected and/or refracted by the electromagnetic wave manipulation apparatus 400 is configurable by adjusting the voltage bias applied to the liquid crystal layer 410. Moreover, the liquid crystal layer 410 may be subjected to a fixed voltage bias and/or a variable voltage bias. When no voltage bias is applied to the liquid crystal layer 410 or when the voltage bias applied to the liquid crystal layer 410 is zero volts, the liquid crystal layer 410 may exhibit its naturally occurring dielectric constant and permittivity.

In some cases, the dielectric constant of the liquid crystal layer 410 may be tuned to vary the phase and/or magnitude of the impinging electromagnetic waves, thus performing electromagnetic wave transformations such as amplifying the impinging electromagnetic waves through constructive interference or cancelling the impinging electromagnetic waves through destructive interference. In some cases, the type and/or magnitude of the electromagnetic wave manipulations, such as the field offset exhibited by the output electromagnetic waves, may be configurable by varying one or more of the thickness of the liquid crystal layer 410, the thickness of the substrate 420, a size of a radiator (e.g., patch radiator) included in the electromagnetic wave manipulation apparatus 400, and/or a shape of the radiator. In some cases, the electromagnetic wave manipulations may be achieved through different shapes and/or sizes radiators, with or without the liquid crystal layer 410.

According to some example embodiments, the electromagnetic wave manipulation apparatus 400 may perform electromagnetic wave transformations in order to direct the impinging electromagnetic waves towards a receiver 430. In the example shown in FIGS. 4A-B, the electromagnetic wave manipulation apparatus 400 may refract the impinging electromagnetic waves in order to direct the electromagnetic waves to the receiver 430. In applications where the electromagnetic wave manipulation apparatus 400 is configured to perform constructive interference, the liquid crystal layer 410 may further amplify the electromagnetic waves directed towards the receiver 430. Alternatively, in other applications, the electromagnetic wave manipulation apparatus 400 may be configured to prevent the electromagnetic waves from reaching the receiver 430, which may be accomplished by directing the electromagnetic waves away from the receiver 430 and/or cancelling the electromagnetic waves through destructive interference.

Figure 5:
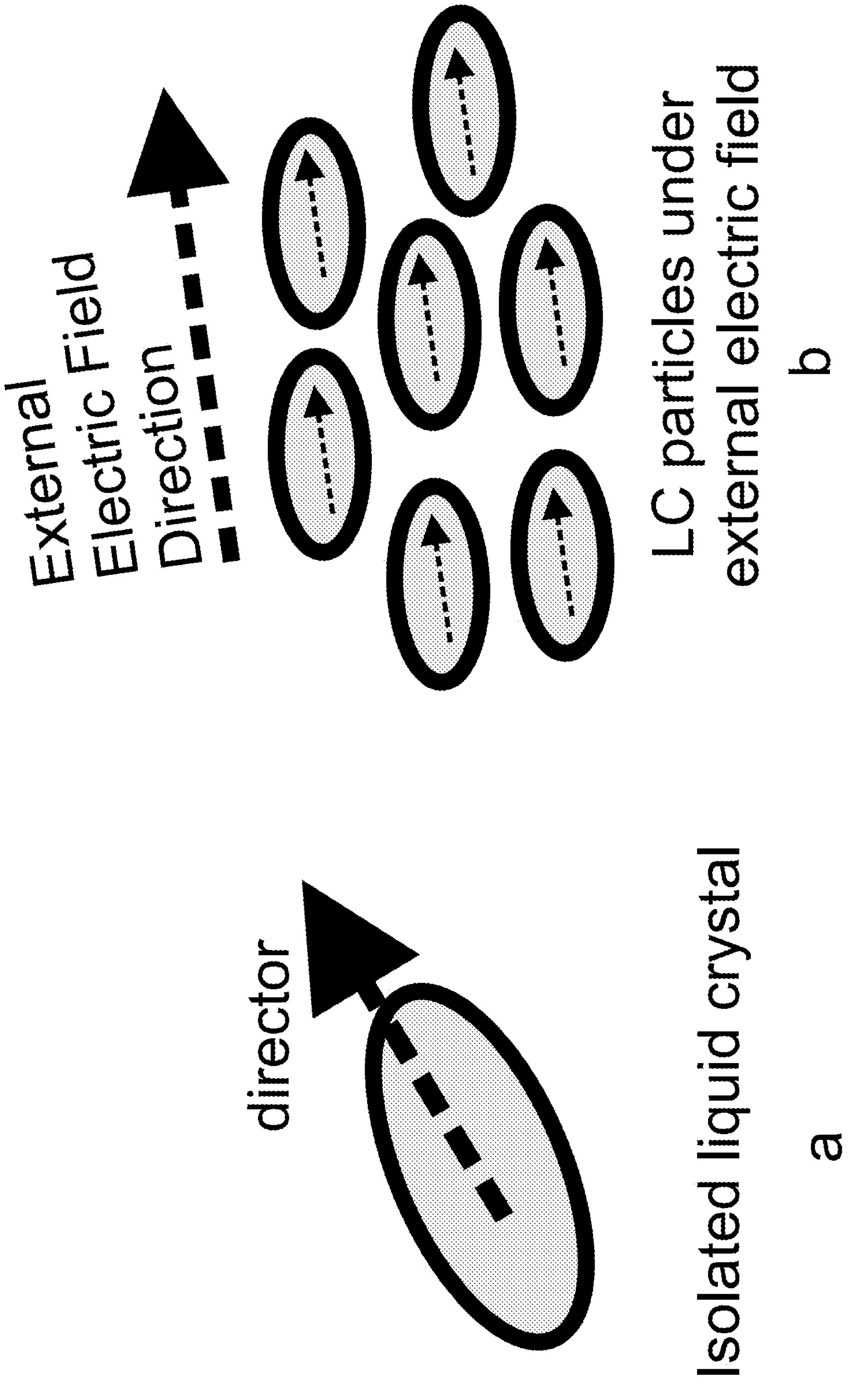
FIG. 5 depicts a schematic diagram illustrating nematic liquid crystal particles in an isolated state and under an external electric field, in accordance with some example embodiments.

The liquid crystal layer 410 may be formed from one or more liquid crystal materials, which are materials having an intermediate state of matter between solids and liquids. Liquid crystals may include identical crystalline particles. One example of a liquid crystal material is nematic liquid crystal, which include rod shaped crystalline particles capable of reorientation in the presence of an external electric field (e.g., a voltage source and/or the like). This phenomenon is illustrated in FIG. 5, with FIG. 5(*a*) depicting the direction of the orientation of a crystalline particle using a "director" vector and FIG. 5(*b*) depicting the change in orientation induced by an external electric field. The advantage of using liquid crystal is the tunability of its dielectric constant. Accordingly, the dielectric constant of the liquid crystal layer 110 may be varied in accordance with the application of the electromagnetic wave manipulation apparatus 400 by adjusting the magnitude of the voltage bias. Additionally, twisted nematic liquid crystals are geometrically oriented in a twisted fashion. Thus, when the liquid crystal layer 410 includes a twisted nematic liquid crystal, the electromagnetic wave manipulation apparatus 400 may be further capable of altering the polarization of the impinging electromagnetic waves owing to the geometric orientation of the liquid crystal particles.

Free space wave-transformation may require special types of surfaces. Accordingly, in some example embodiments, the first substrate 420*a* and the second substrate 420*b* may be two-dimensional sheets of metamaterials which may be a single-layered material or, as shown in FIG. 6(*a*), a multi-layered material having a periodic arrangement of identical elements (also known as unit cell) in a variety of geometric configurations. As used herein, the term "metamaterial" may refer to a material engineered to have a property not found in naturally occurring materials. A metamaterial may be formed from assemblies of multiple elements (e.g., unit cells) fashioned from composite materials including, for example, metals, plastics, and/or the like. For example, each layer of the metamaterial may be formed from a combination of rigid materials such as printed circuit boards, flexible materials such as a liquid crystal polymer (LCP), a textile based dielectrics, and/or the like. In the example shown in FIGS. 4A-B, when the electromagnetic wave impinges on the first substrate 420*a* and/or the second substrate 420*b*, an aggregate effect is observed due to the presence of those periodic unit cells on each surface. The result may be a variety of electromagnetic wave transformations including, for example, perfect anomalous reflection, anomalous refraction, polarization conversion, transmission, absorption, and/or the like.

Figure 7:
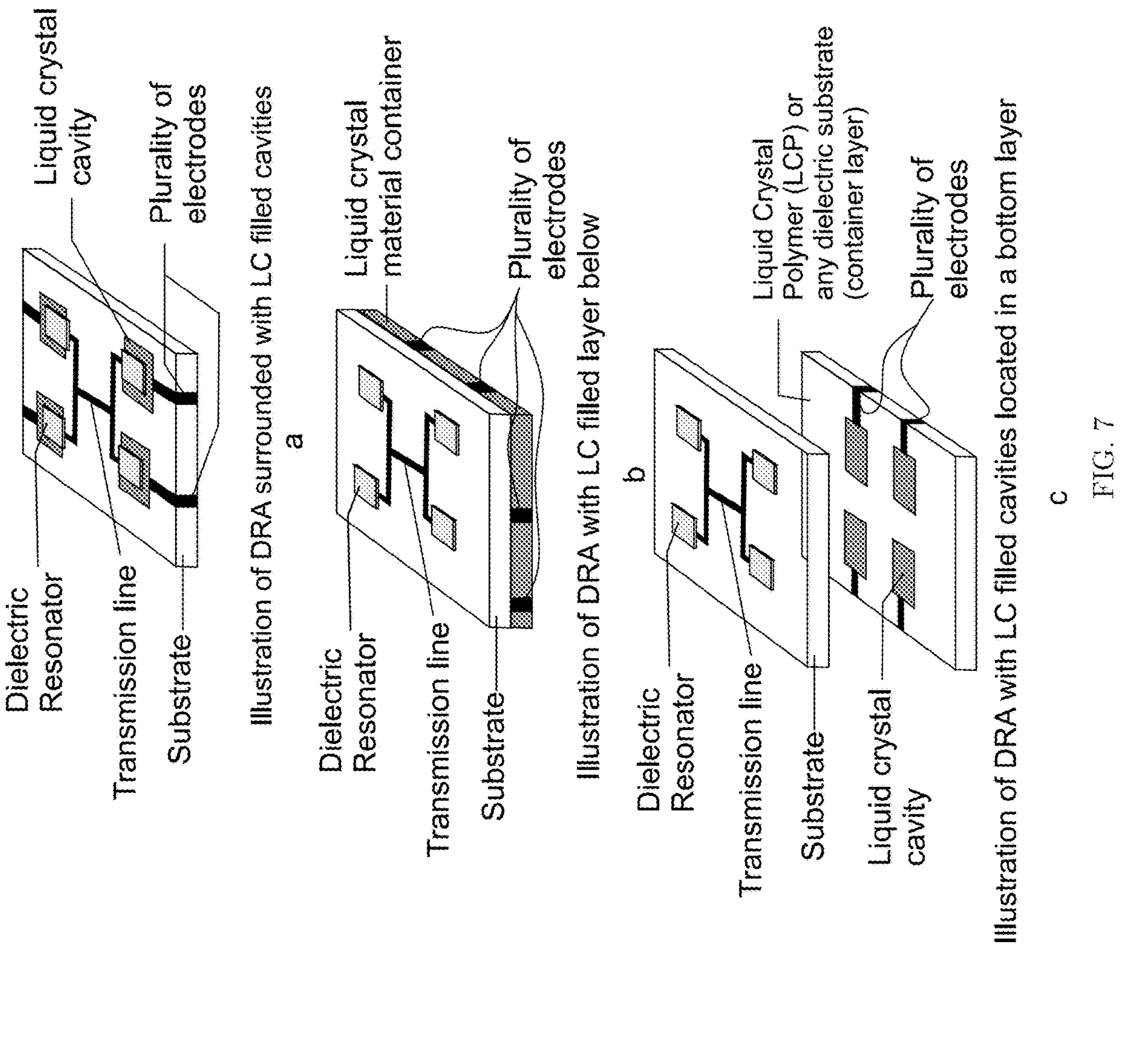
FIG. 7 depicts various examples of a liquid crystal based dielectric resonator antenna array, in accordance with some example embodiments.

In some example embodiments, the electromagnetic wave manipulation apparatus 400 may be a liquid crystal based dielectric resonator antenna array, examples of which are shown in FIG. 7. In FIG. 7(*a*), cavities filled with liquid crystal materials are used to surround each dielectric resonator antenna elements that are fed either electrically by transmission lines or wirelessly by another antenna or by combination of both. The substrate of the antenna can be either rigid (e.g., a printed circuit board) and/or flexible (e.g., a liquid crystal polymer (LCP)). The cavities are electrically biased by one or more electrodes applying, for example, a direct current (DC) voltage. Based on the bias voltage, the local dielectric constant in the substrate will change and a field offset is introduced to each dielectric resonator in a controlled manner for the constructive (of destructive) addition of the impinging electromagnetic waves. In some cases, the liquid crystal layer may also be utilized as a substrate with zero voltage bias, in which case the dielectric constant of the liquid crystal corresponds to the dielectric constant that the liquid crystal exhibits in its natural unbiased state. As used herein, the term "field offset" may include an offset in a phase, an amplitude, a polarization, a delay, and/or a frequency of an electromagnetic wave. FIG. 7(*b*) depicts an alternative configuration having a dual-layer structure in which an additional layer of liquid crystal is disposed beneath the antenna substrate. Electrodes coupled with the liquid crystal layer may impart a different voltage that gives rise to local variations in the dielectric constant of the liquid crystal layer. In FIG. 7(*c*), the layer beneath the antenna substrate may also include liquid crystal filled cavities having a variety of geometric configurations.

Figure 8:
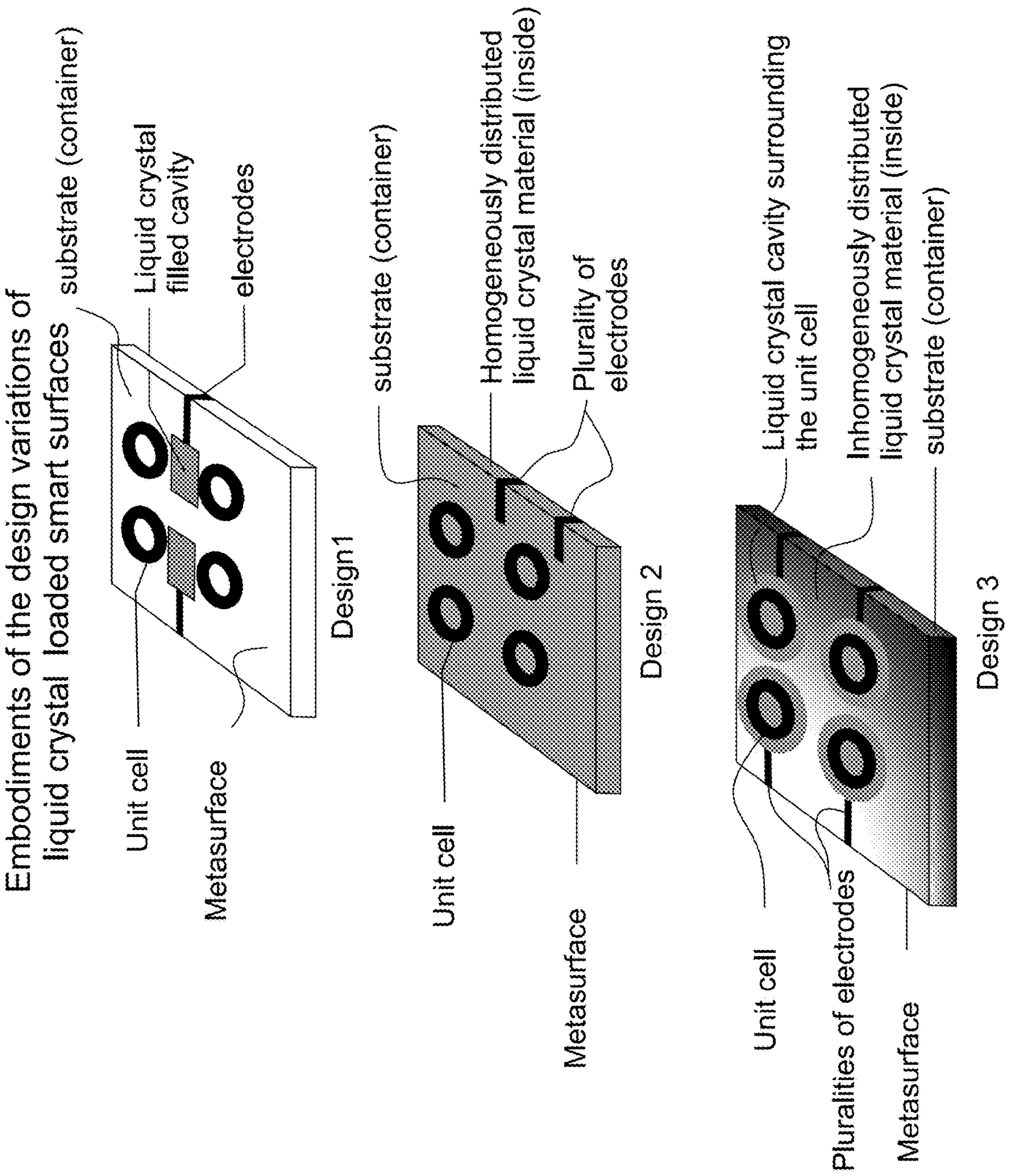
FIG. 8 depicts various examples of a liquid crystal based smart surface, in accordance with some example embodiments.

In some example embodiments, the electromagnetic wave manipulation apparatus 400 may be a liquid crystal based smart surface, examples of which are shown in FIG. 8. As used herein, the term "smart surface" may refer to a metamaterial surface having periodic arrangements of unit cells. As shown in FIG. 8, the liquid crystal based smart surface may include a rigid and/or flexible substrate in which a liquid crystal is incorporated in various manners. In some cases, the smart surface may have a multi-layered configuration, with each layer having a separate periodic arrangement of unit cells. The geometric configuration of the unit cells may vary. Moreover, the unit cells may be formed from metallic traces, conductive polymers, solid dielectric materials, liquid dielectric materials, or a combination thereof. As noted, the liquid crystal material may be incorporated into the substrate in a variety of manner. For example, a liquid crystal material may be disposed in cavities at the select sites on the substrate such as around the unit cells, between the unit cells, and/or the like. Alternatively and/or additionally, the liquid crystal material may be distributed, either homogeneously or non-homogeneously, in the materials of the substrate. To electrically bias the liquid crystal, one or more of electrodes may be coupled with the smart surface. Using multiple electrodes, each of which applying a different bias voltage, may introduce local variations in the dielectric constant across the smart surface. This local variation in dielectric constant may enable the smart surface to alter the phase and/or magnitude of the impinging electromagnetic waves, thus performing electromagnetic wave transformations such as reflection, refraction, retro-reflection, absorption, amplification, cancellation, and/or the like.

Figure 9:
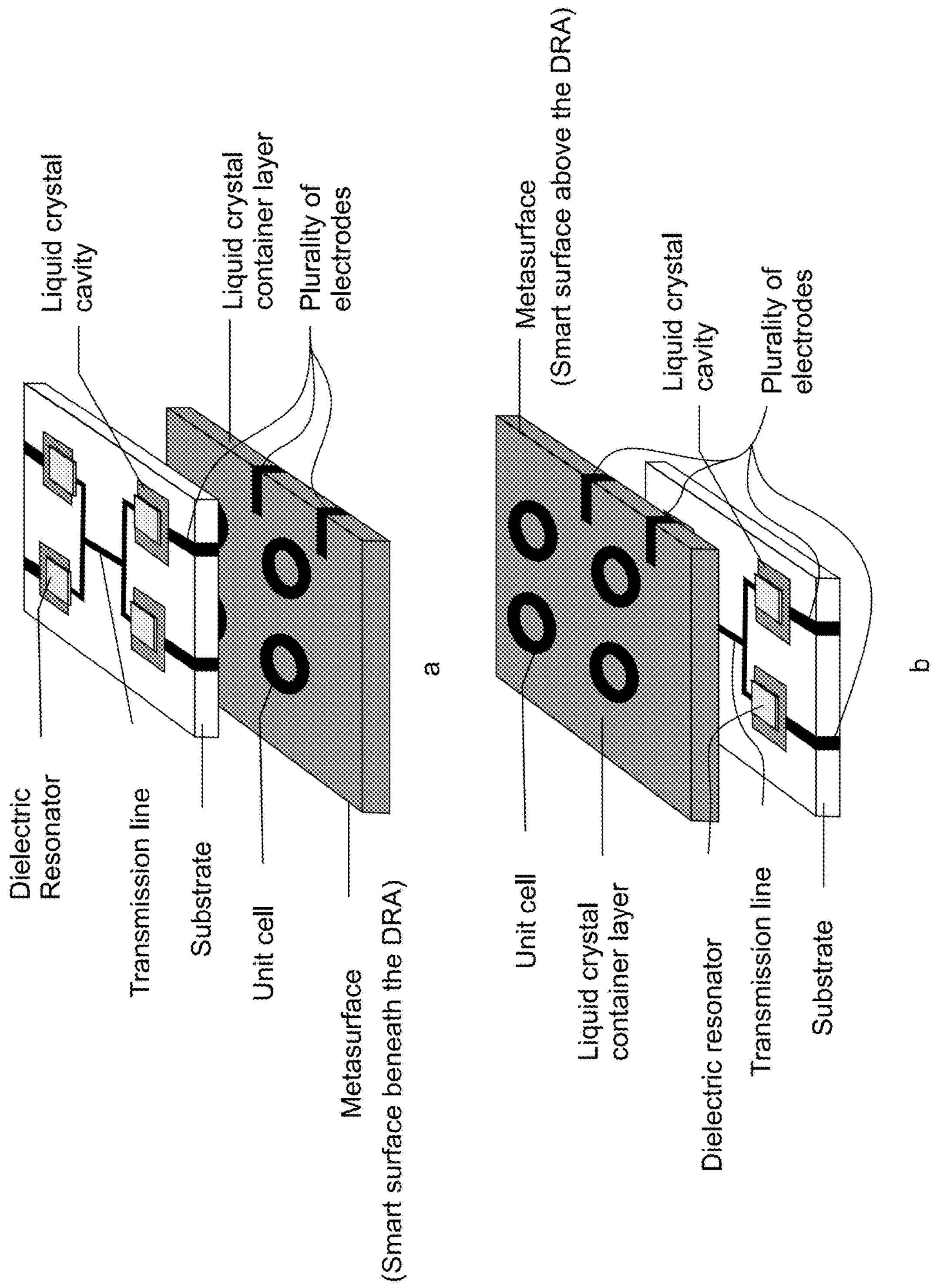
FIG. 9 depicts various examples of a liquid crystal based dielectric resonator antenna array loaded with a liquid crystal based smart surface, in accordance with some example embodiments.

FIG. 9 depicts various examples of a smart surface loaded dielectric resonator antenna array, which combines a liquid crystal based dielectric resonator antenna with a liquid crystal based smart surface.

Figure 10:
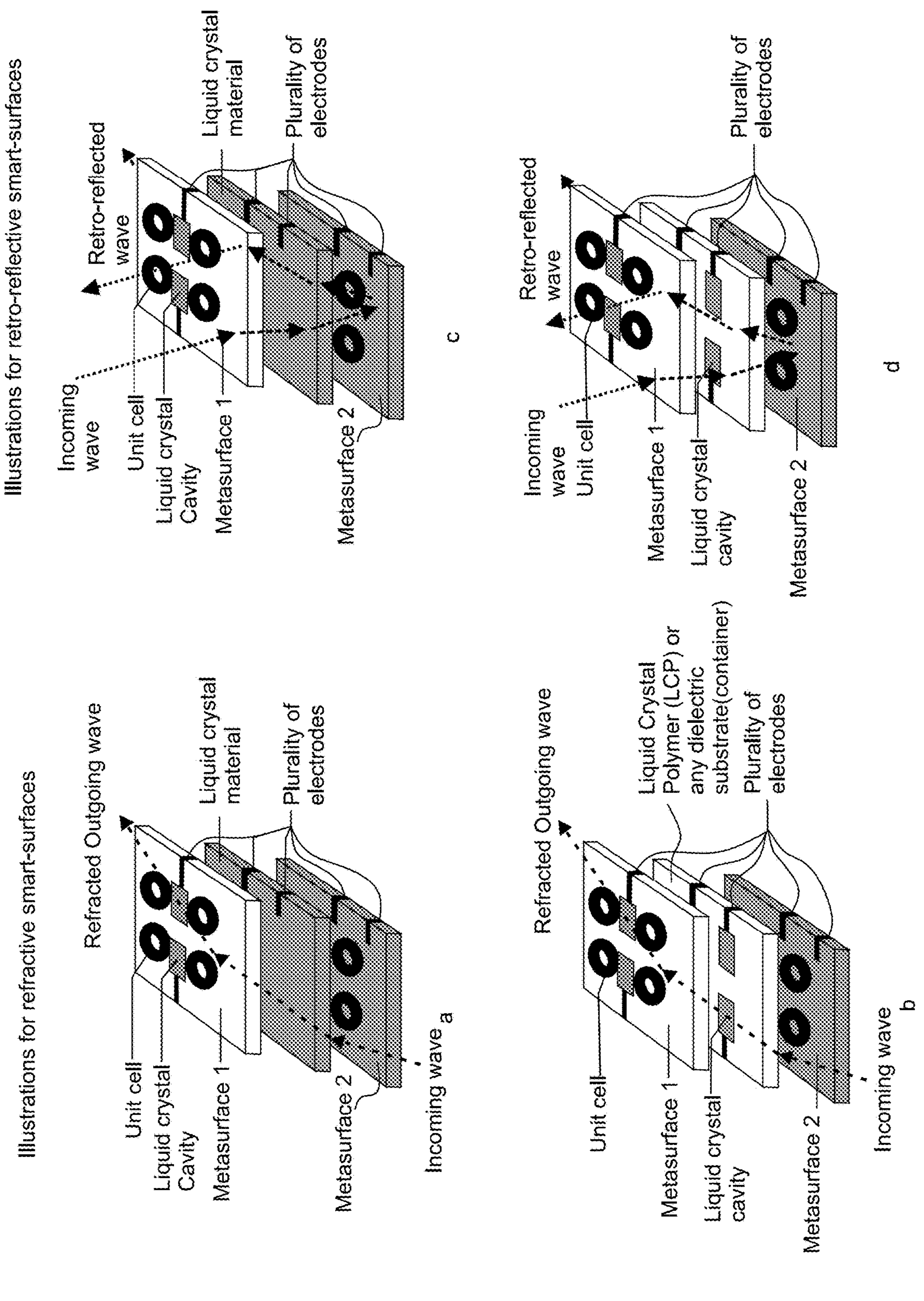
FIG. 10 depicts various examples of a liquid crystal based smart surface performing various electromagnetic wave transformations, in accordance with some example embodiments.

FIG. 10 various examples of a liquid crystal based smart surface performing various electromagnetic wave transformations, in accordance with some example embodiments. FIGS. 10(*a*) and (*b*) depicts a liquid crystal based smart surface having a multi-layered structure in which a liquid crystal layer or a substrate with liquid crystal filled cavities are interposed between two metasurface layers. Multiple electrodes may be coupled with the smart surface in order to impart local variations in the dielectric constant of the liquid crystal. Each metasurface layer may be a multi-layered stack of a rigid dielectric material or a flexible dielectric material. The unit cells of the metasurface layers may have any geometric configuration. Moreover, the unit cells may be formed from metallic traces, conductive polymers, solid dielectric materials, liquid dielectric materials, or a combination thereof. The metasurface layers may be transmissive, reflective, refractive, and/or inhibitive.

FIG. 10(*b*) depicts an example configuration having a transmissible refractive case. When an electromagnetic wave impinges a first outer metasurface, the electromagnetic wave may be refracted by a liquid crystal layer with liquid crystal filled cavities before being refracted out by the second outer metasurface. The magnitude of refraction may vary spatially and may be controlled by varying the dielectric constant of liquid crystal, for example, by changing the external voltage bias, the geometry of the unit cells within the metasurfaces, and/or the like.

Figure 11:
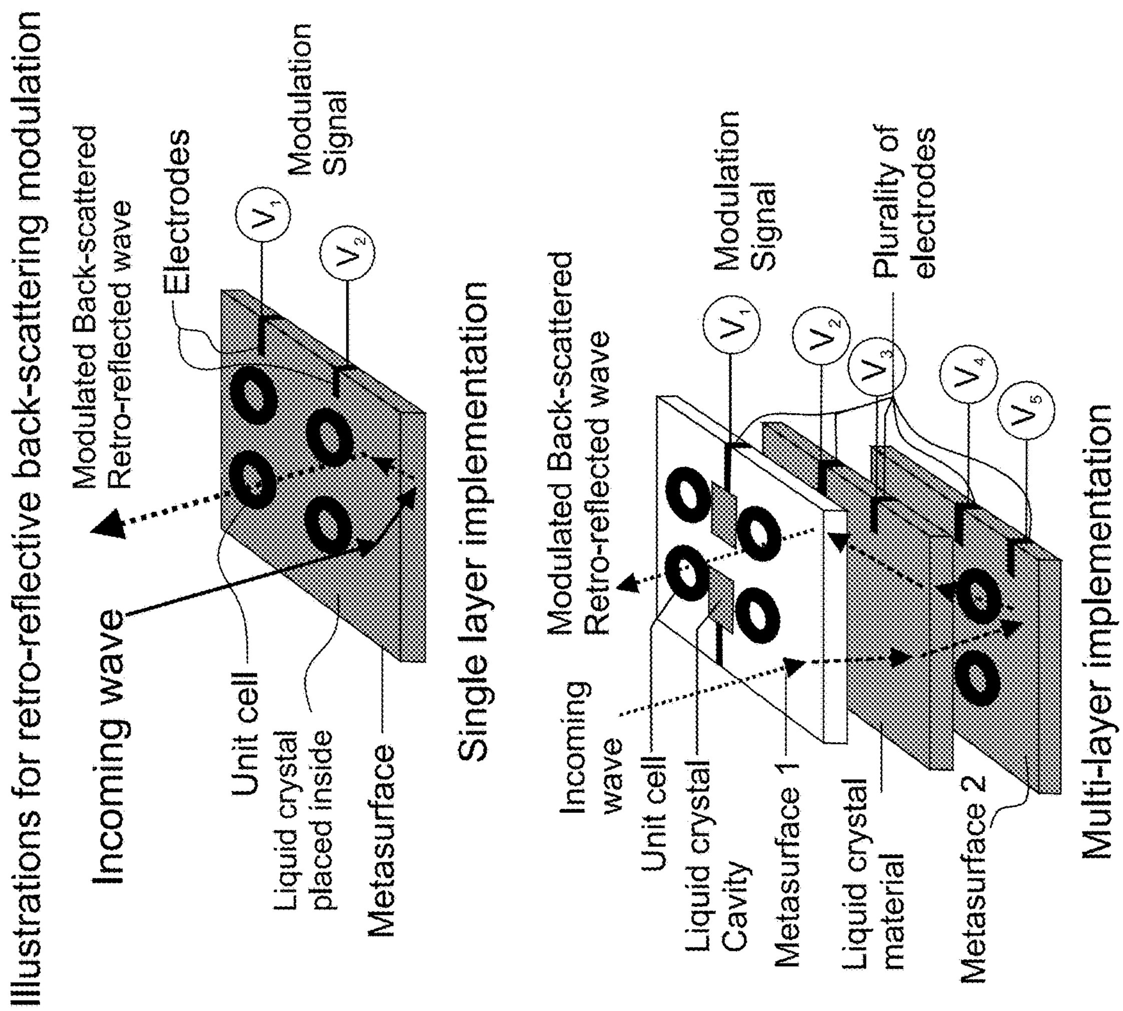
FIG. 11 depicts an example of a liquid crystal based smart surface performing a retro-reflective back-scattering modulation, in accordance with some example embodiments.

FIG. 11 depicts an example of a liquid crystal based smart surface performing a retro-reflective back-scattering modulation, in accordance with some example embodiments. As shown in FIG. 11, retro-reflective back-scattering may be performed by either a single smart surface or a stack of coupled smart surfaces. Liquid crystal may be incorporated in the smart surfaces by being disposed inside cavities within the metasurface or interposed between two or more smart surfaces. One or more electrodes may be coupled with the liquid crystal. Coupling the liquid crystal with multiple electrodes may allow the liquid crystal to be subjected to different bias voltages, thus imparting local variations in the dielectric constant of the liquid crystal. This local variation in the dielectric constant of the liquid crystal may be used to modulate the back-scattered electromagnetic waves, thus enabling the encoding data in the retro-reflected signal.

Figure 12:
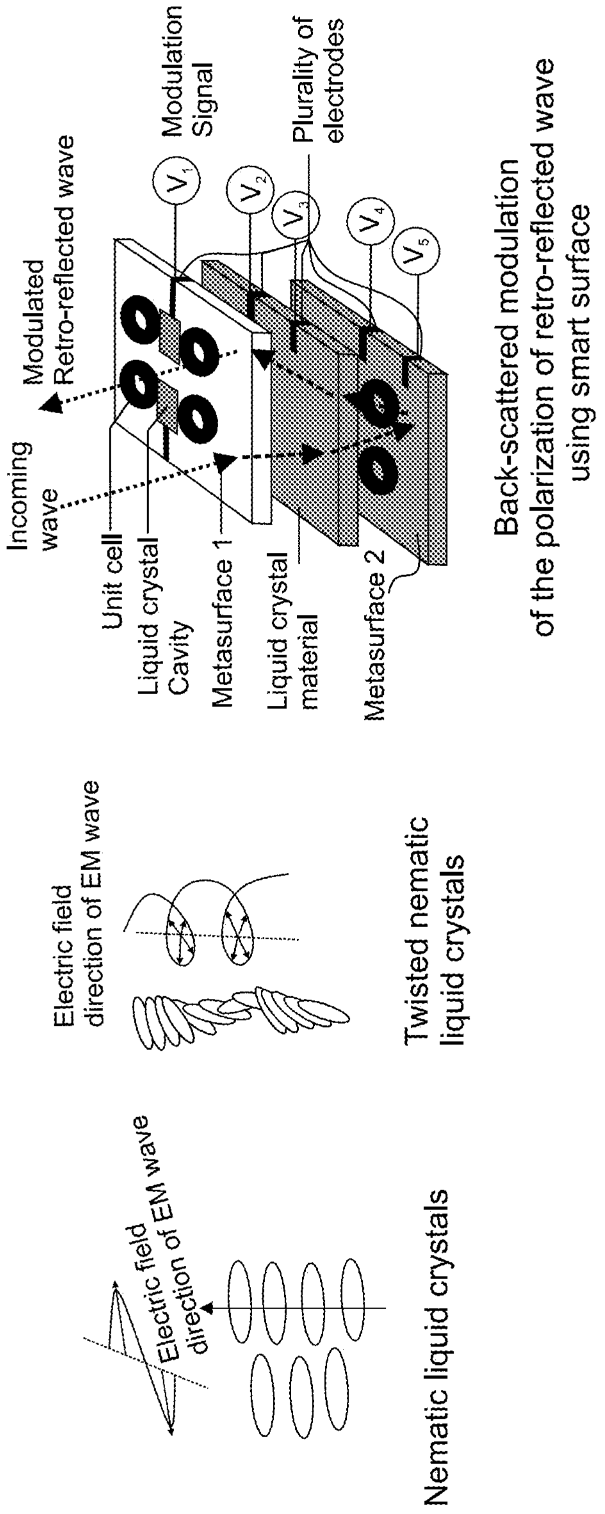
FIG. 12 depicts an example of a liquid crystal based smart surface performing a back-scattered modulation of polarized retro-reflected electromagnetic waves, in accordance with some example embodiments.

FIG. 12 depicts an example of a liquid crystal based smart surface performing a back-scattered modulation of polarized retro-reflected electromagnetic waves, in accordance with some example embodiments. For example, FIG. 12 shows the propagation of an electromagnetic wave through a nematic liquid crystal. The geometric orientation of the nematic liquid crystal particles may determine the direction of the electromagnetic wave traversing through the nematic liquid crystal. Moreover, the geometric orientation of the nematic liquid crystal particles may be determined by the direction of the external electric field. For example, FIG. 9 shows that the nematic liquid crystal particles geometrically oriented in a helical fashion, thus rotating the direction of the electromagnetic wave traversing through the nematic liquid crystal. When subjected to an external electrical bias, the twisted nematic liquid crystals may be realigned in parallel with this external electric field. This property of nematic liquid crystals may be exploited to modulate the polarization of the electromagnetic wave. For instance, in retro-reflective smart surfaces, changing the polarization of the retro-reflective wave in either a linear and/or a circular manner may encode data in the back-scattered electromagnetic wave for communication purposes.

Figure 15:
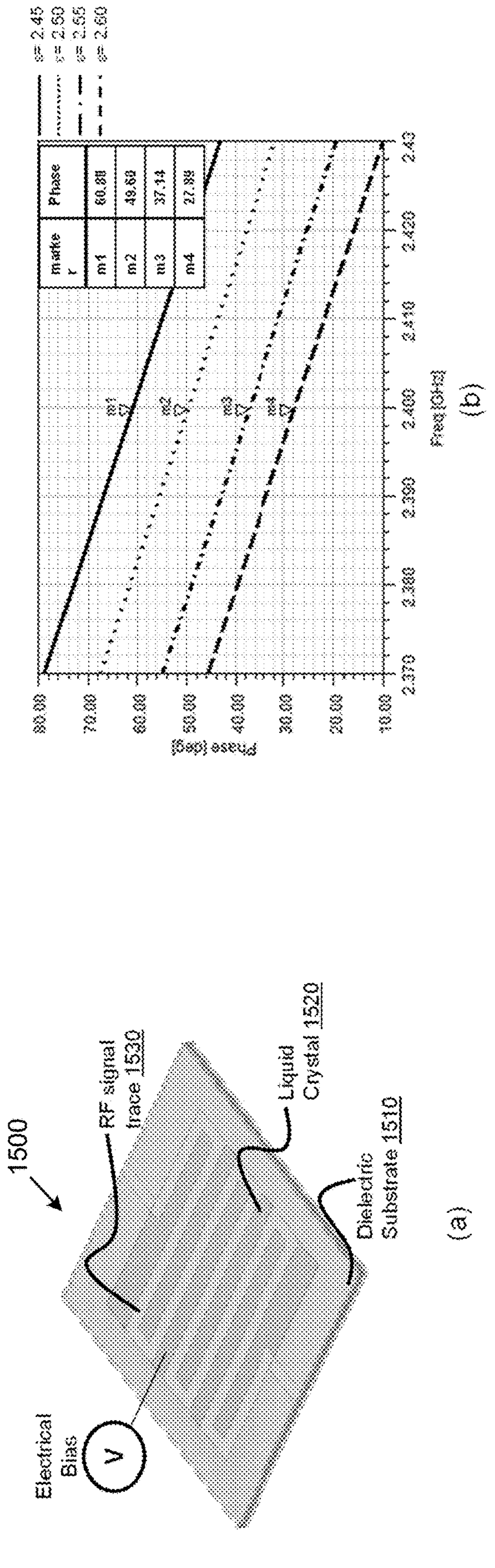
FIG. 15 depicts an example of an electromagnetic wave manipulation apparatus, in accordance with some example embodiments.

In some example embodiments, apparatuses that incorporate a liquid crystal material, such as dielectric resonator antennas and smart surfaces, may be capable of transforming impinging electromagnetic waves by altering the phase and/or magnitude of the impinging electromagnetic waves. FIG. 15 depicts an example of an electromagnetic wave manipulation apparatus 1500, in accordance with some example embodiments. Referring to FIG. 15(*a*), the electromagnetic wave manipulation apparatus 1500 may include a substrate 1510 that incorporates a liquid crystal 1520 and a radio frequency (RF) signal trace 1530. A phase shift in the electromagnetic waves impinging on the liquid crystal phase shifter 1500 may be achieved by applying an electrical voltage bias on the liquid crystal 1520. The electrical voltage bias may alter the permittivity of the liquid crystal 1520, thus introducing a phase difference between the impinging electromagnetic waves and the transmitted electromagnetic waves. FIG. 15(*b*) shows the phase change present in the electromagnetic wave transmitted by the electromagnetic wave manipulation apparatus 1500 for various electrical bias voltages.

Figure 16A:
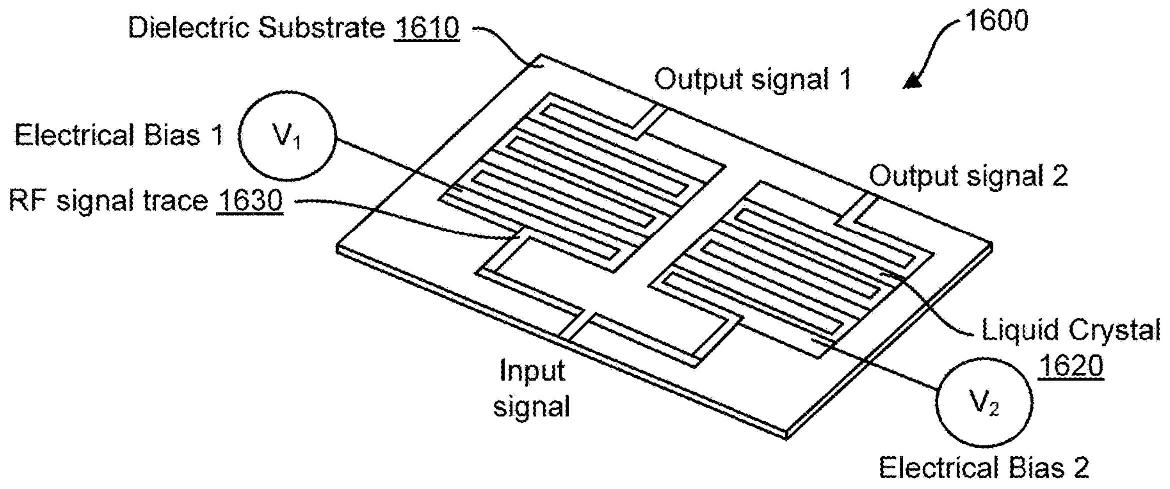
FIGS. 16A-B depict another example of an electromagnetic wave manipulation apparatus, in accordance with some example embodiments.
Figure 16B:
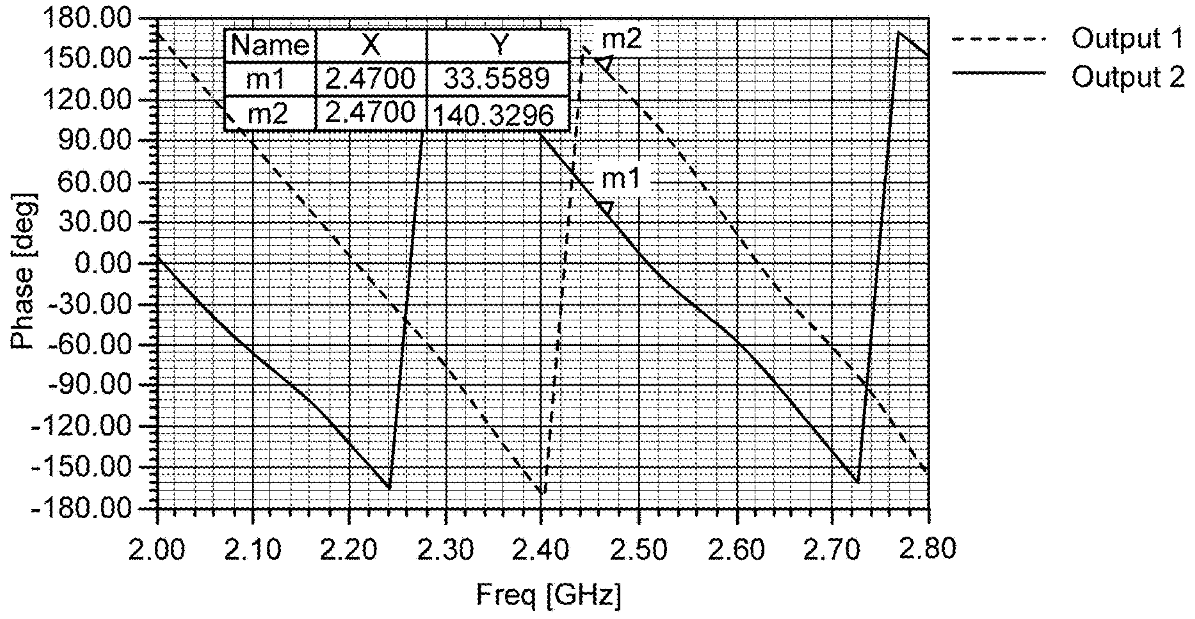

FIGS. 16A-B depict another example of an electromagnetic wave manipulation apparatus 1600, in accordance with some example embodiments. Referring to FIG. 16A, the electromagnetic wave manipulation apparatus 1600 may include a substrate 1610 that incorporates a liquid crystal 1620 and a radio frequency (RF) signal trace 1630. In the example of the electromagnetic wave manipulation apparatus 1600 shown in FIG. 16A, the substrate 1620 may include multiple cavities, each of which being filled by the liquid crystal 1620. However, it should be appreciated that the substrate 1610 and the liquid crystal 1620 may be integrated in a different manner than shown. Moreover, as shown in FIG. 16A, the liquid crystal 1620 may be subjected to two different bias voltages $v_1$ and $v_2$. Doing so may impart local variations in the dielectric constant of the liquid crystal 1620 such that the liquid crystal 1620 may exhibit local variations in permittivity. As such, the electromagnetic wave manipulation apparatus 1600 may generate output signals, such as an output signal 1 and output signal 2, having phase shifts corresponding to the bias voltages $v_1$ and $v_2$. That is, as shown in FIG. 16B, the electromagnetic wave manipulation apparatus 1600 may generate, in response to the input signal, a first output signal having a first phase shift (relative to the input signal) corresponding to the first bias voltage $v_1$ and a second output signal having a second phase shift (relative to the input signal) corresponding to the second bias voltage $v_2$.

Figure 17:
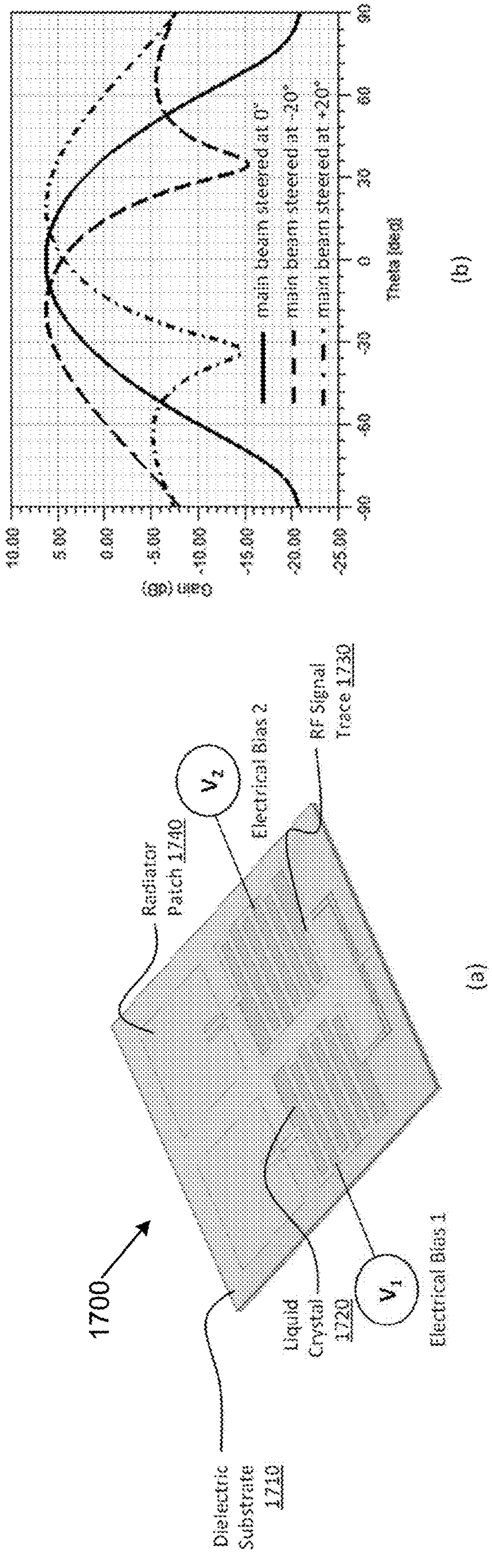
FIG. 17 depicts another example of an electromagnetic wave manipulation apparatus, in accordance with some example embodiments.

FIG. 17 depicts another example of an electromagnetic wave manipulation apparatus 1700, in accordance with some example embodiments. Referring to FIG. 17(*a*), the electromagnetic wave manipulation apparatus 1700 may include a substrate 1710 that incorporates a liquid crystal 1720, a radio frequency (RF) signal trace 1730, and one or more radiators 1740. In the example shown in FIG. 17(*a*), the one or more radiators 1740 may be radiator patches.

Moreover, as shown in FIG. 17(*a*), the liquid crystal 1720 may be subjected to two different bias voltages $v_1$ and $v_2$, thus imparting local variations in the dielectric constant of the liquid crystal 1620 that give rise to local variations in the permittivity of the liquid crystal 1620. The resulting output signals from the electromagnetic wave manipulation apparatus 1700 may include a first output signal having a first phase shift (relative to the input signal) corresponding to the first bias voltage $v_1$ and a second output signal having a second phase shift (relative to the input signal) corresponding to the second bias voltage $v_2$. These shifts in the phase of the input signal may operate to electronically steer the main output beam of the electromagnetic wave manipulation apparatus 1700, which may be the sum of the first output signal and the second output signal. For instance, FIG. 17(*b*) shows the main output beam being steered at various angles including 0°, −20°, and +20°. The steering of the main output beam may be achieved through the constructive and/or destructive interferences between the first output signal and second output signal. Moreover, in addition to the spatial variation in the external bias voltage shown in FIG. 17, it should be appreciated that the external bias voltage may also be varied in the time domain to change the radiation pattern of the main output beam, for example, in accordance to a beamforming codebook.

Figure 18:
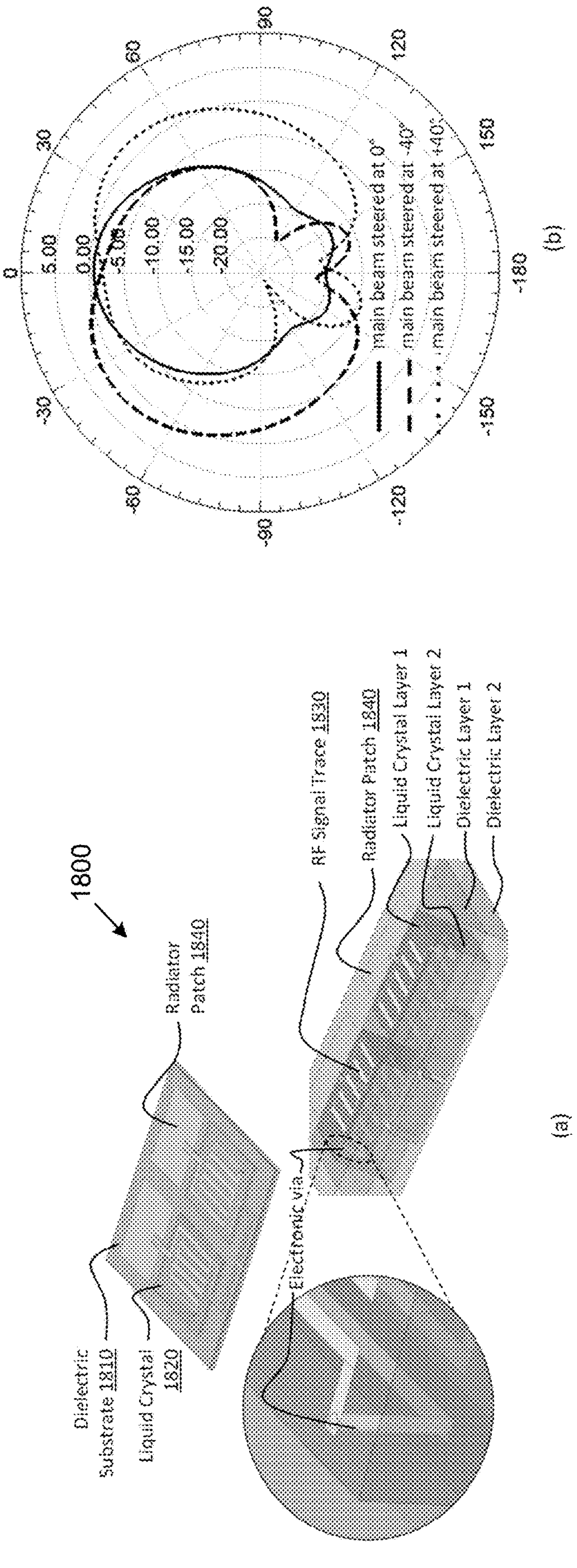
FIG. 18 depicts another example of an electromagnetic wave manipulation apparatus, in accordance with some example embodiments.

FIG. 18 depicts another example of an electromagnetic wave manipulation apparatus 1800, in accordance with some example embodiments. Referring to FIG. 18(*a*), the electromagnetic wave manipulation apparatus 1800 may include a substrate 1810 that incorporates a liquid crystal 1820, a radio frequency (RF) signal trace 1830, and one or more radiators 1840. As shown in FIG. 18(*a*), the liquid crystal 1720 may be subjected to two different bias voltages $v_1$ and $v_2$ in order to impart local variations in the dielectric constant of the liquid crystal 1620. Moreover, in the example of the electromagnetic wave manipulation apparatus 1800 shown in FIG. 18(*a*), the substrate 1810 and the liquid crystal 1820 are multi-layered. The output signals from the electromagnetic wave manipulation apparatus 1800 may include a first output signal having a first phase shift (relative to the input signal) corresponding to the first bias voltage $v_1$ and a second output signal having a second phase shift (relative to the input signal) corresponding to the second bias voltage $v_2$. As shown in FIG. 18(*b*), these shifts in the phase of the input signal may operate to electronically steer the main output beam of the electromagnetic wave manipulation apparatus 1700, for example, at various angles including 0°, −40°, and +40°.

Figure 19A:
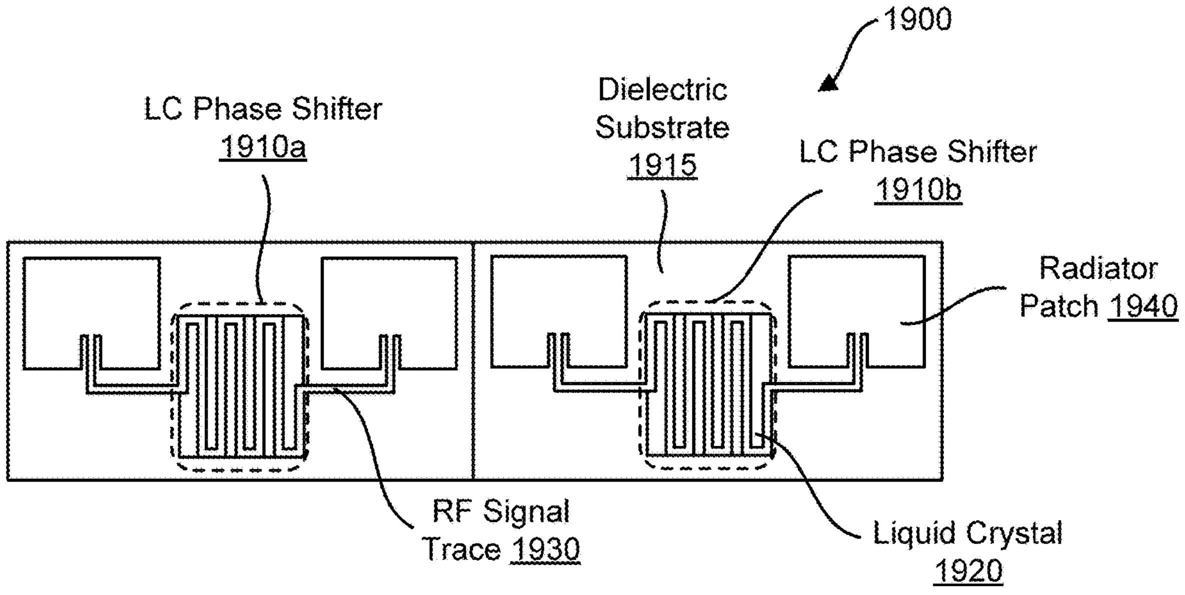
FIGS. 19A-B depict another example of an electromagnetic wave manipulation apparatus, in accordance with some example embodiments.
Figure 19B:
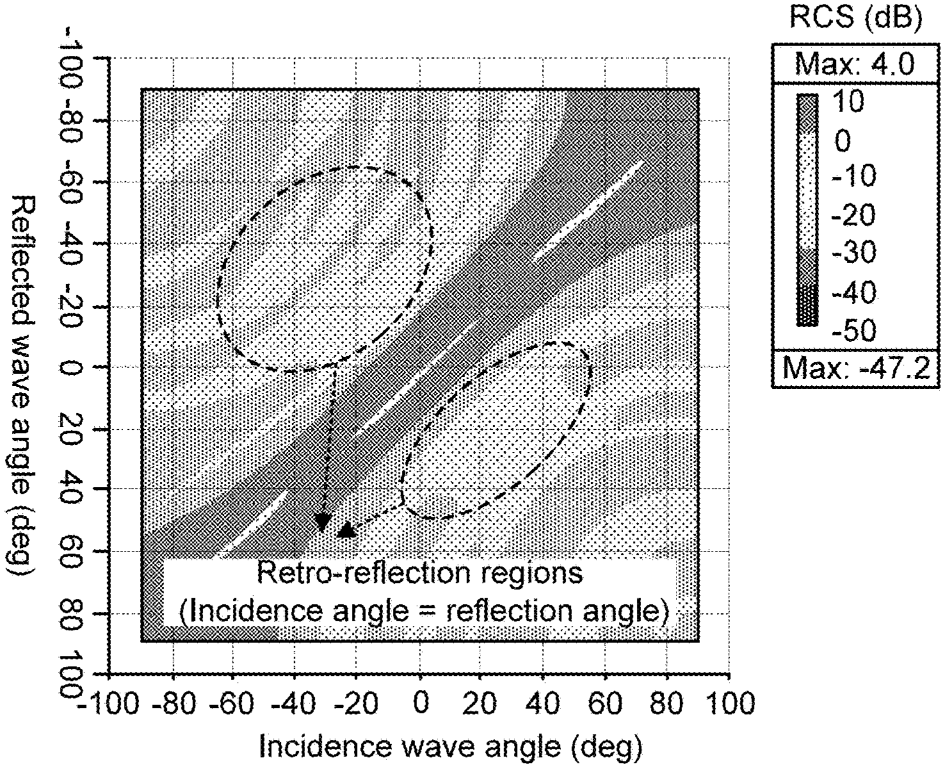

FIGS. 19A-B depict another example of an electromagnetic wave manipulation apparatus 1900, in accordance with some example embodiments. According to some example embodiments, the electromagnetic wave manipulation apparatus 1900 may be configured to perform retro-reflection of the impinging electromagnetic wave by at least producing an output beam whose angle of reflection is the same as the incidence angle of the impinging electromagnetic wave. Referring to FIG. 19A, the electromagnetic wave manipulation apparatus 1800 may include a first liquid crystal phase shifter 1910*a* and a second liquid crystal phase shifter 1910*b*, each of which including a substrate 1910 that incorporates a liquid crystal 1920, a radio frequency (RF) signal trace 1930, and one or more radiators 1940. FIG. 19B shows the radar cross section (RCS) plot of the electromagnetic wave manipulation apparatus 1900, with the dotted-circular regions indicating the retro-reflection operation in which the reflected electromagnetic wave is redirected in a same direction as the incident electromagnetic wave.

Figure 20:
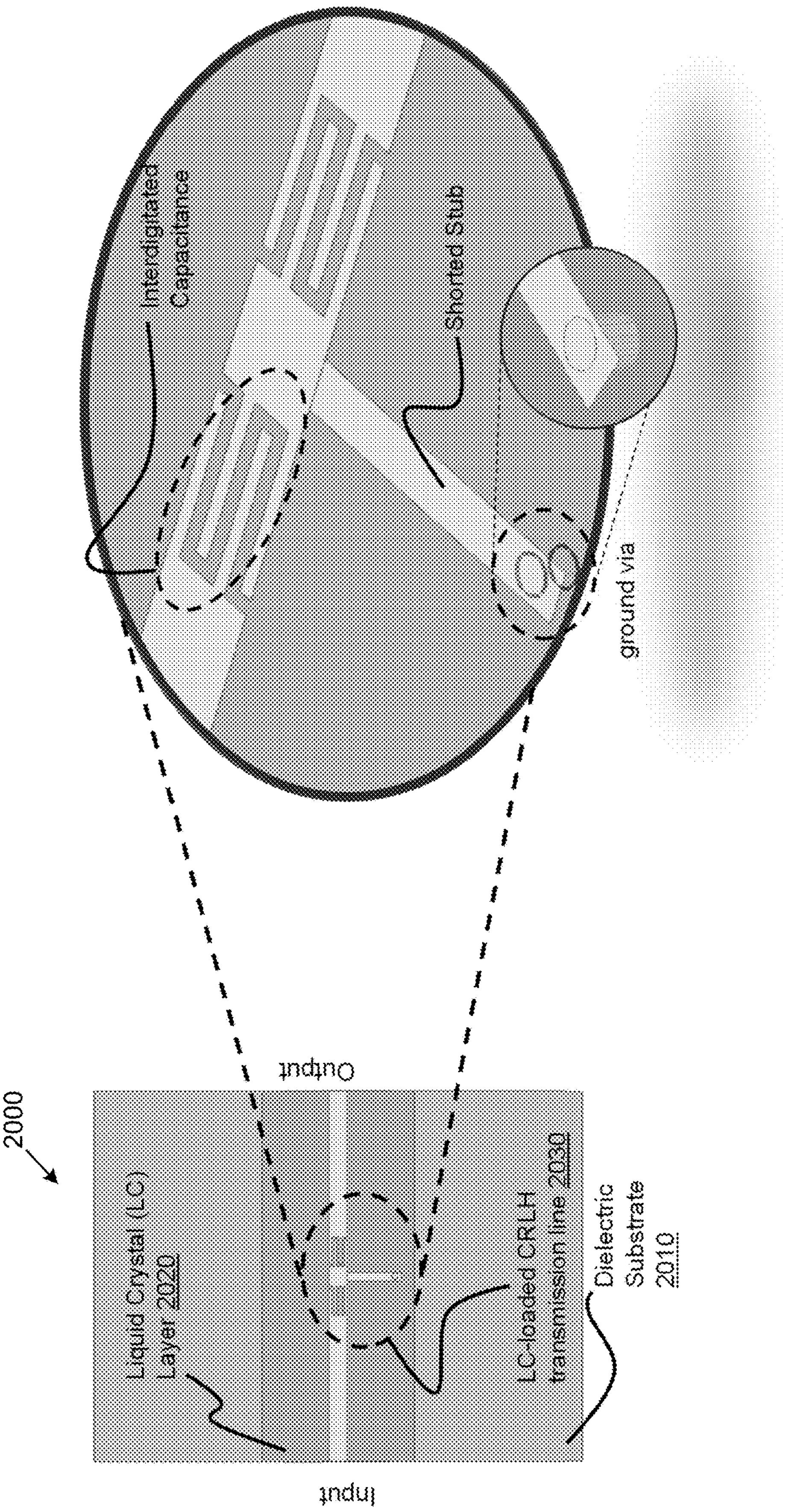
FIG. 20 depicts an example of a liquid crystal loaded composite right left hand (CRLH) phase shifter, in accordance with some example embodiments.
Figure 21:
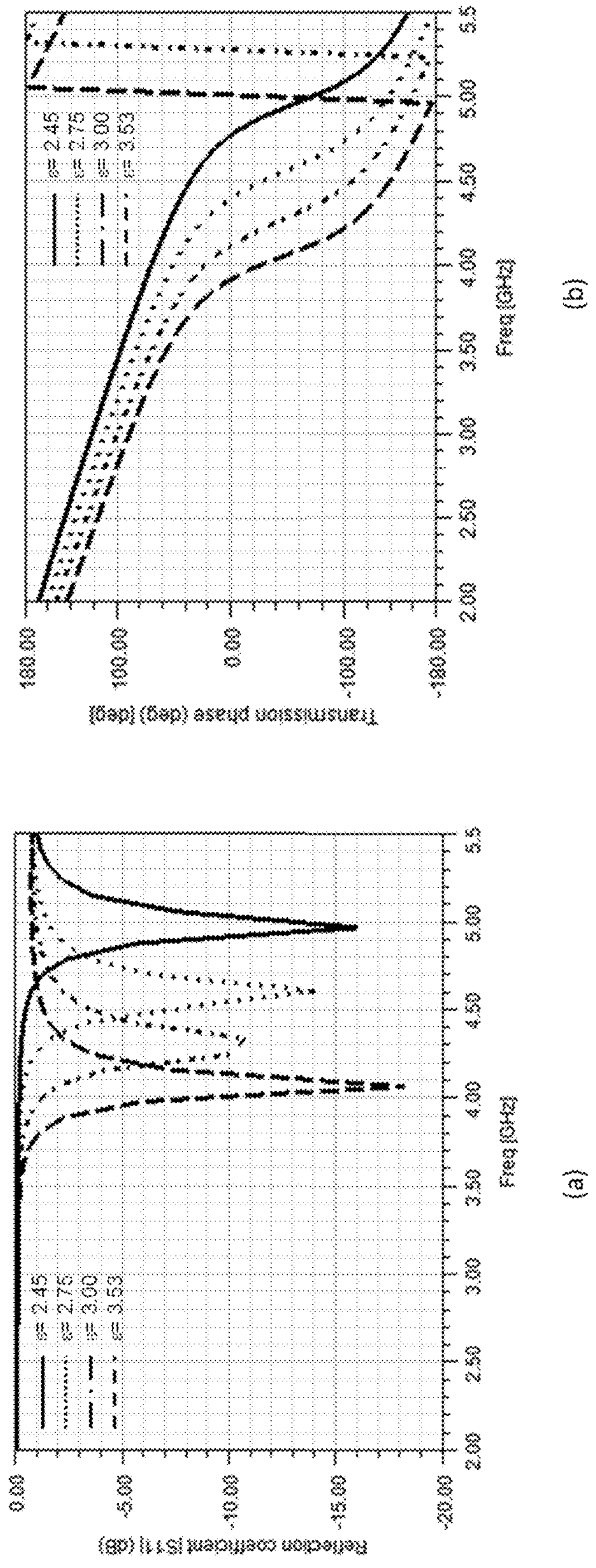
FIG. 21 depicts graphs depicting the relationship between operating frequency, reflection coefficient, and transmission phase, in accordance with some example embodiments.
Figure 22:
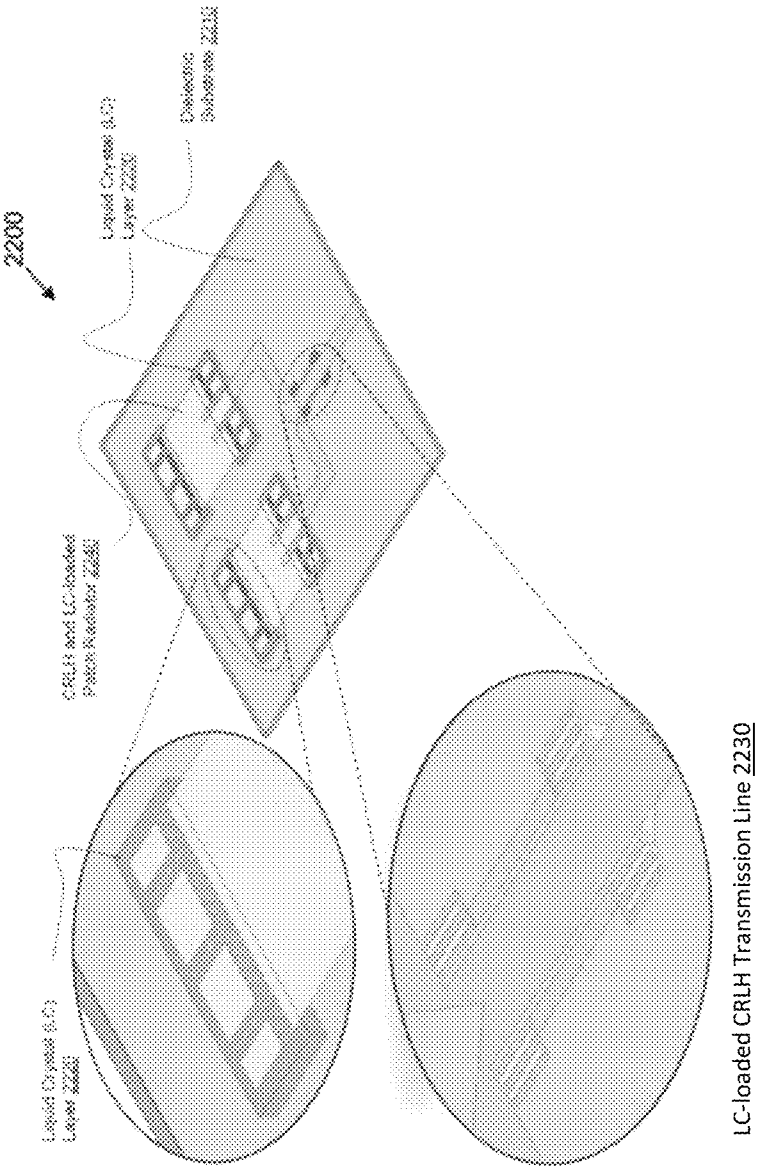
FIG. 22 depicts an example of a liquid crystal loaded composite right left hand (CRLH) smart surface, in accordance with some example embodiments.

In some example embodiments, multiple electromagnetic wave manipulation apparatuses may be combined to form, for example, the smart surface loaded dielectric resonator antenna array shown in FIG. 9. Other examples of hybrid electromagnetic wave manipulation apparatuses are shown in FIGS. 21-22. For example, FIG. 20 depicts a liquid crystal loaded composite right left hand (CRLH) phase shifter 2000, in accordance with some example embodiments. Referring to FIG. 20, the liquid crystal loaded composite right left hand (CRLH) phase shifter 2000 may include a substrate 2010 that incorporates a liquid crystal (LC) layer 2020 and a transmission line 2030. In the example shown in FIG. 20, the transmission line 2030 may be a planar transmission line, for example, a coplanar waveguide or a microstrip line, that includes interdigitated capacitance, a shorted stub, and a ground via. In some cases, the transmission line 2030 may be formed from a metamaterial, which may be a single-layered or multi-layered material having a periodic arrangement of identical elements (also known as unit cell) in a variety of geometric configurations.

The liquid crystal loaded composite right left hand (CRLH) phase shifter 2000 may operate to transmit electromagnetic waves having a different magnitude (e.g., reflection coefficient) and/or phase than the electromagnetic waves received at the liquid crystal loaded composite right left hand (CRLH) phase shifter 2000. For instance, in some example embodiments, a phase shift may be achieved by subjecting the liquid crystal layer 2020 to an electrical voltage bias that changes the permittivity of the liquid crystal layer 2020. As shown in FIG. 21(*a*), the operating frequency of the liquid crystal loaded composite right left hand (CRLH) phase shifter 2000 may be variable and subject to configuration. FIG. 21(*b*) demonstrate the transmission phase configurability of the liquid crystal loaded composite right left hand (CRLH) phase shifter 2000, which may also be adjusted by varying the permittivity of the liquid crystal loaded composite right left hand (CRLH) phase shifter 2000.

FIG. 22 depicts an example of a liquid crystal loaded composite right left hand (CRLH) smart surface 2200, in accordance with some example embodiments. As shown in FIG. 22, the liquid crystal loaded composite right left hand (CRLH) smart surface 2200 may include a substrate 2210 that incorporates a liquid crystal layer 2220 and a transmission line 2230. In the example shown in FIG. 22, the liquid crystal loaded composite right left hand (CRLH) smart surface 2200 may include multiple radiators 2240, each of which being coupled with the liquid crystal layer 2220 and the transmission line 2230. According to some example embodiments, subjecting the liquid crystal layer 2220 coupled with each radiator 2240 to a different electrical voltage bias may give rise to a spatial phase gradient across the surface of the liquid crystal loaded composite right left hand (CRLH) smart surface 2200. For example, each radiator 2240 may output a beam having a different field offset relative to the each other. This phase gradient, which may further vary in the time domain, may enable the liquid crystal loaded composite right left hand (CRLH) smart surface 2200 to steer its output beam.

Figure 23:
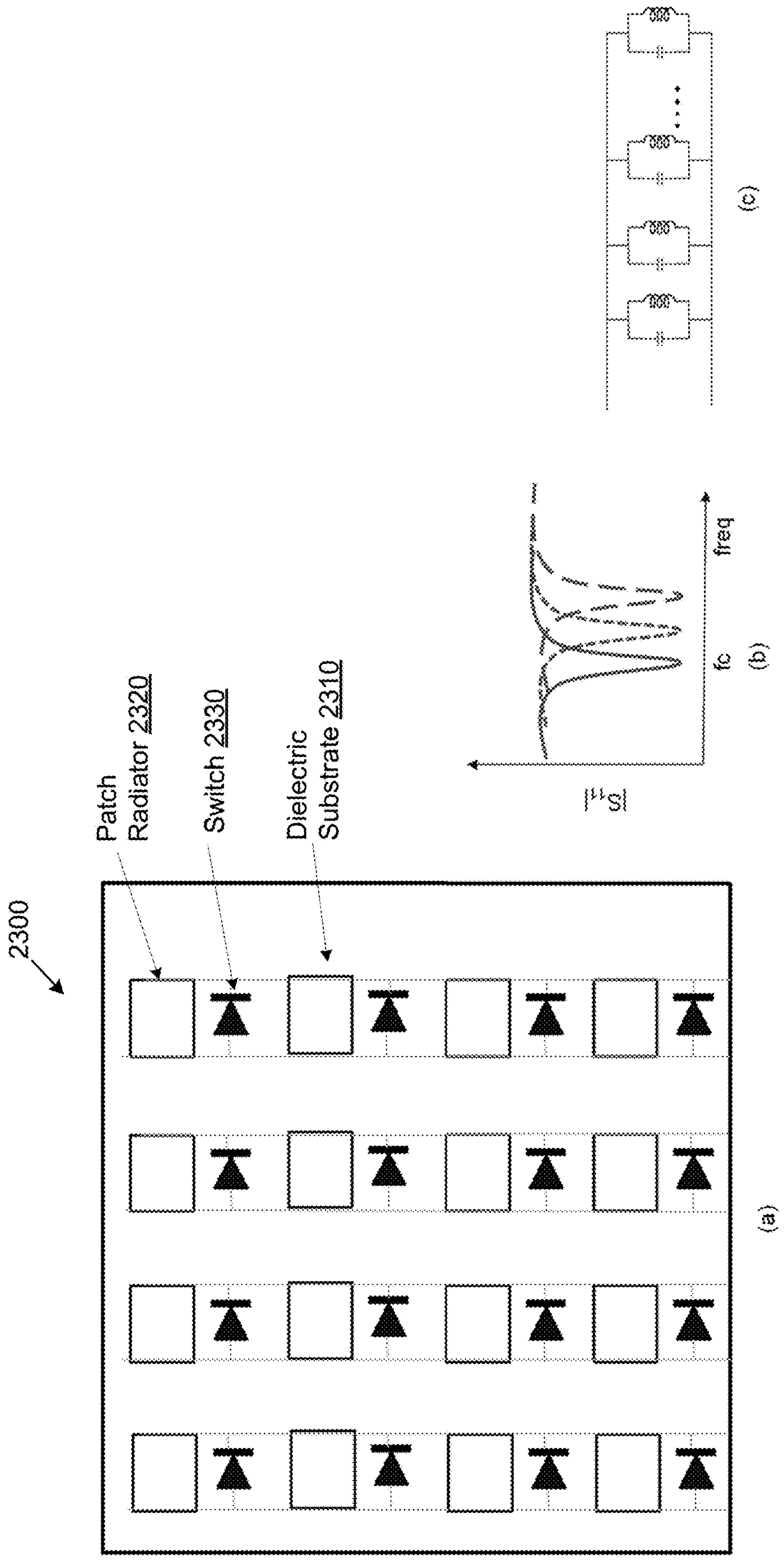
FIG. 23 depicts an example of a field programmable antenna array (FPAA), in accordance with some example embodiments.

FIG. 23 depicts an example of a field programmable antenna array (FPAA) 2300, in accordance with some example embodiments. As shown in FIG. 23(*a*), the field programmable antenna array 2300 may include a substrate 2310 having multiple radiators, each of which being coupled with a switch. For example, as shown in FIG. 23(*a*), the field programmable antenna array 2300 may include a radiator 2320 (e.g., a patch radiator shown in FIG. 23(*a*)) coupled with a switch 2330. The switch 2330 may be a diode. As such, when the switch 2330 is on (or forward biased), the corresponding radiator 2320 may be connected in parallel with one or more other patch radiators in the field programmable antenna array 2300 with a forward biased switch to form the equivalent circuit shown in FIG. 23(*c*). Alternatively, when the switch 2330 is off (or reverse biased), the corresponding radiator 2320 may be disconnected from the other radiators in the field programmable antenna array 2300. FIG. 23(*b*) shows that the reflection coefficient ($S_{11}$) of switches 2330 and radiators 2340 that are connected in parallel at a particular time may determine the operating frequency ($f_c$) of the field programmable antenna array 2300 for that cycle.

Figure 24A:
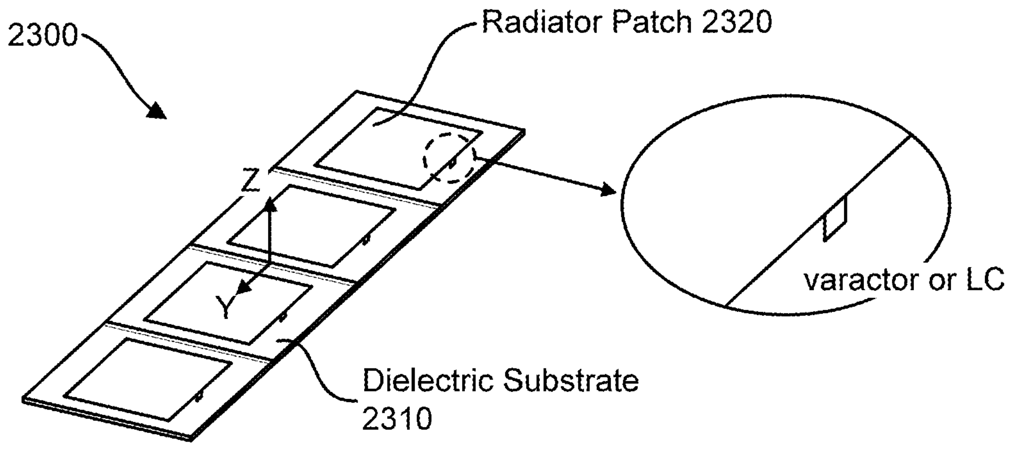
FIGS. 24A-C depict another example of a field programmable antenna array (FPAA), in accordance with some example embodiments.
Figure 24B:
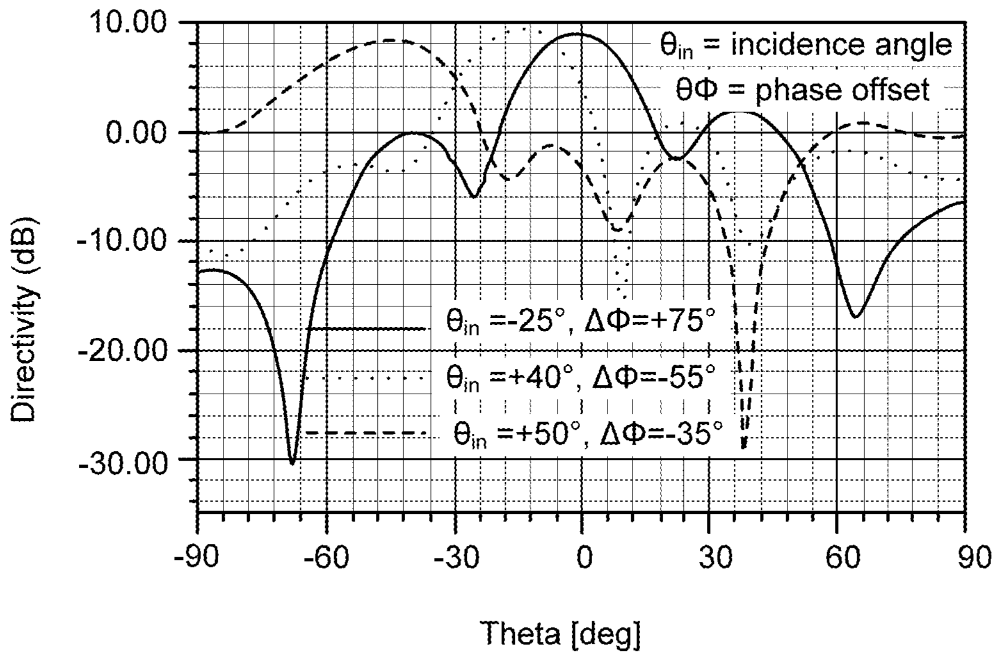
Figure 24C:
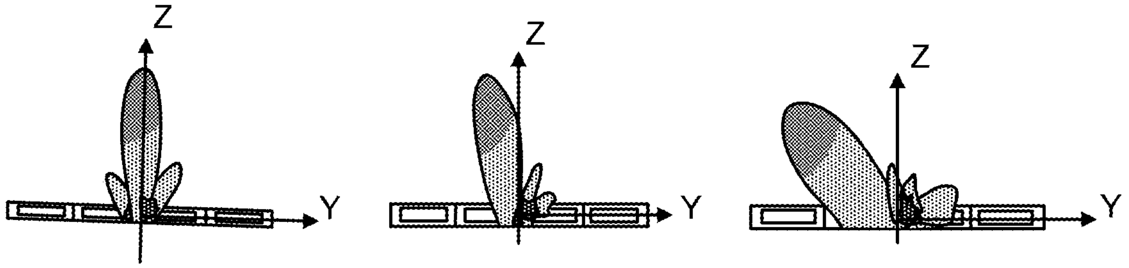

FIGS. 24A-C depict another example of the field programmable antenna array (FPAA) 2300, in accordance with some example embodiments. In the example of the field programmable antenna array 2300 shown in FIG. 24A, the switch 2330 coupled with the radiator 2320 may be implemented using a liquid crystal material or a varactor (e.g., a transistor such as a metal-oxide-semiconductor field-effect transistor (MOSFET) and/or the like). Thus, subjecting the switch 2330 to an analog voltage bias may introduce a phase shift in the electromagnetic waves output by the radiator 2320. Variations in the analog voltage bias applied to the radiators in the field programmable antenna array (FPAA) 2300 may give rise to a phase gradient across the surface of the field programmable antenna array 2300 as each radiator may be biased to exhibit a different phase shift. This phase gradient may enable the field programmable antenna array 2300 to steer its output beam at various angles. For example, FIG. 24B depicts the beam pattern of the reflected electromagnetic waves for different incident angles $\theta_{in}$° at various elevation angles (Theta°) relative to the surface of the field programmable antenna array 2300. The corresponding radiation patterns observed on the surface of the field programmable antenna array 2300 in three-dimensional space are shown in FIG. 24C.

To further illustrate, Table 1 below depicts the beam-steering angle for various incidence angle $\theta_{in}$° and phase offsets $\Delta\varphi$°.

TABLE 1

| No. | Phase Offset, $\Delta_\varphi$° | Incidence Angle, $\theta_{in}$° | Beam Steering Angle° |
|---|---|---|---|
| 1 | −55° | +40° | −14° |
| 2 | −35° | +50° | −44° |
| 3 | +75° | −25° | −1° |

Figure 25A:
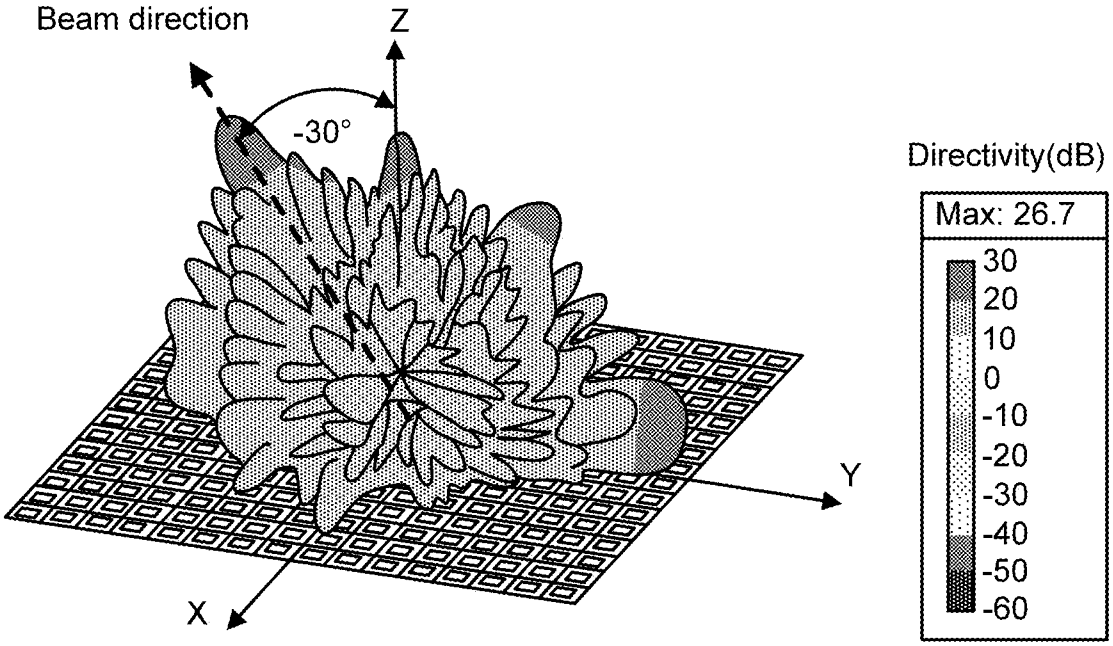
FIGS. 25A-B depict the beam steering capabilities of a field programmable antenna array (FPAA), in accordance with some example embodiments.
Figure 25B:
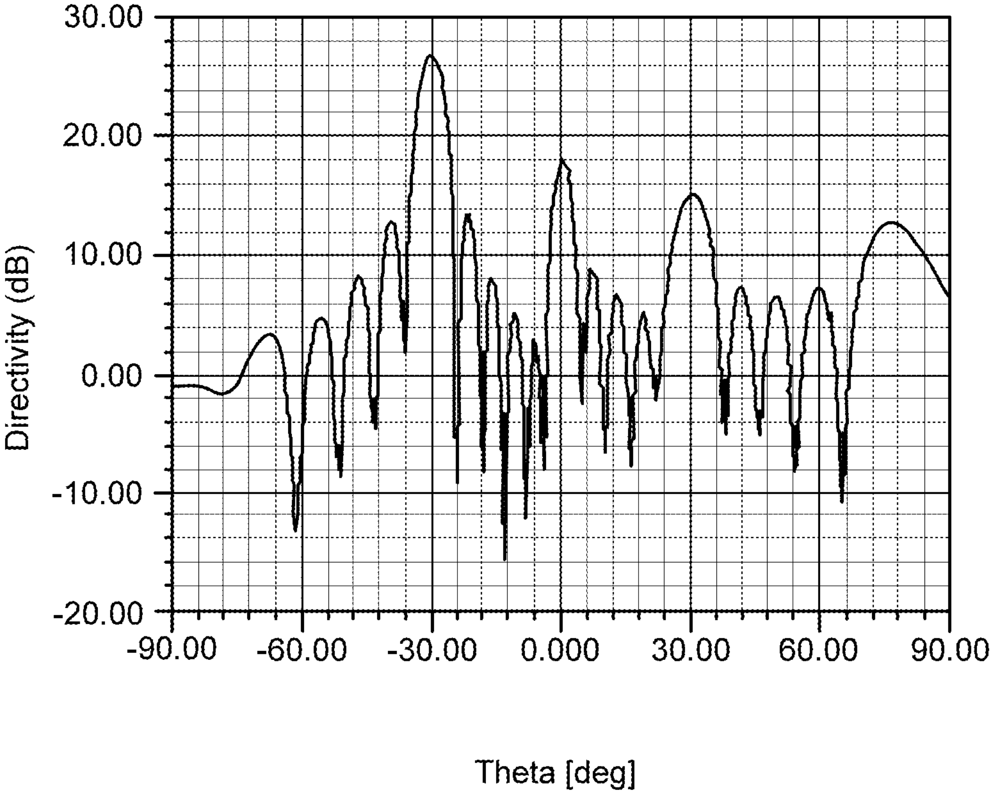

The beam steering capabilities of the field programmable antenna array 2300 are further shown in FIGS. 25A-B. For example, FIG. 25A depicts, in three-dimensional space, the surface radiation pattern of a reflected electromagnetic wave that the field programmable antenna array 2300 steered at −30°. FIG. 25B shows the beam pattern of the reflected electromagnetic wave that is steered at −30° at various angles (Theta°) relative to the surface of the field programmable antenna array 2300.

Figure 26:
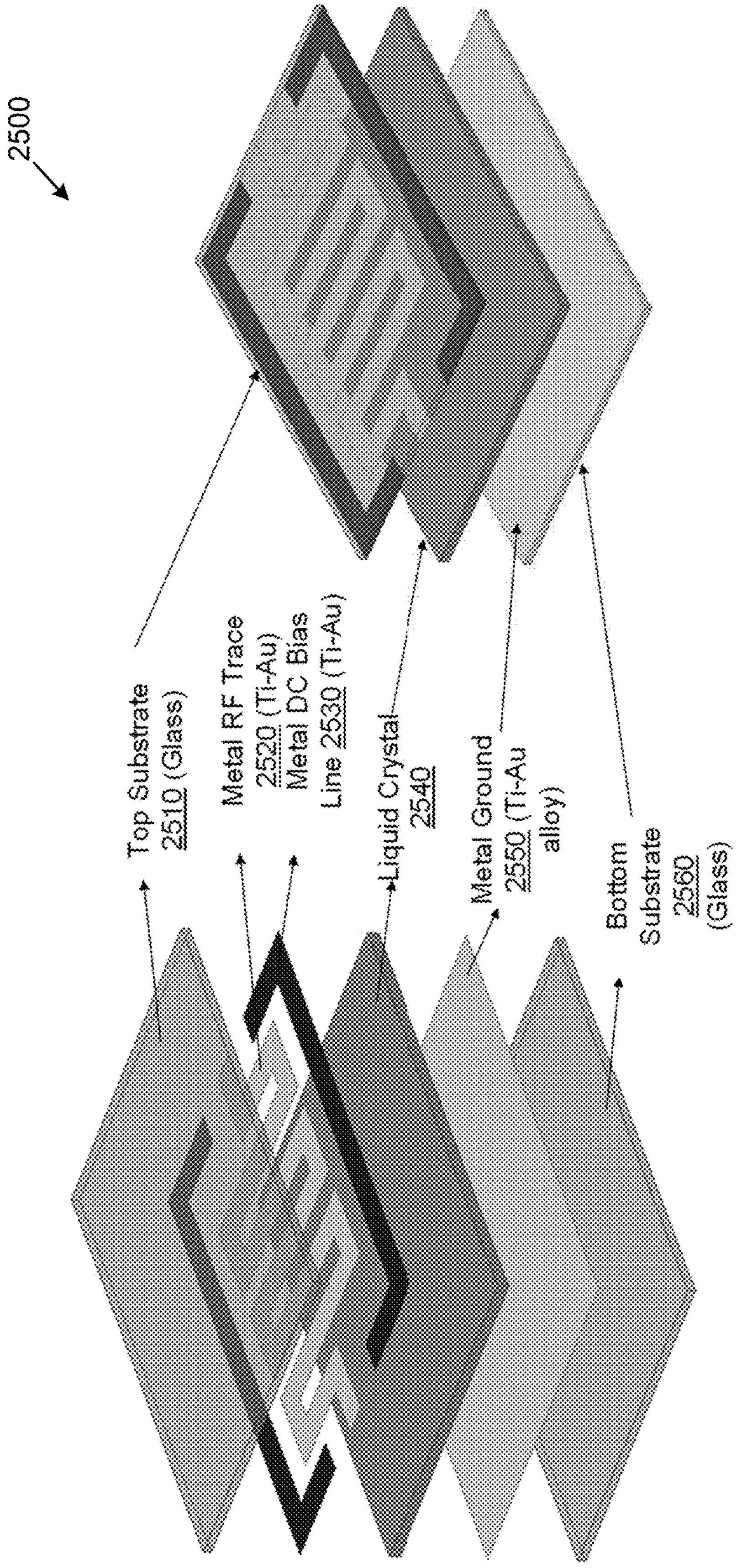
FIG. 26 depicts a schematic diagram illustrating exploded views of an example of an electromagnetic wave manipulation apparatus, in accordance with some example embodiments.

FIG. 26 depicts a schematic diagram illustrating exploded views of an example of an electromagnetic wave manipulation apparatus 2500, in accordance with some example embodiments. The electromagnetic wave manipulation apparatus 2500 shown in FIG. 26 may implement one or more of the phase shifters, dielectric resonator antenna arrays, field programmable antenna arrays, and smart surface described herein. Referring to FIG. 26, the electromagnetic wave manipulation apparatus 2500 may include a top substrate 2510 and a bottom substrate 2560 formed from glass (or another material). The electromagnetic wave manipulation apparatus 2500 may further include, interposed between the top substrate 2510 and the bottom substrate 2560, a radio frequency (RF) trace 2520, a direct current (DC) bias line 2530, a liquid crystal 2540, and a ground 2550. In the example shown in FIG. 26, the radio frequency trace 2520, the direct current bias line 2530, and the ground 2550 may be formed from a metallic material such as a titanium gold (Ti—Au) alloy. The liquid crystal 2530 may include a variety of liquid crystal materials including, for example, quartz, liquid crystal polymer (LCP), nematic liquid crystal, and/or the like.

Figure 28:
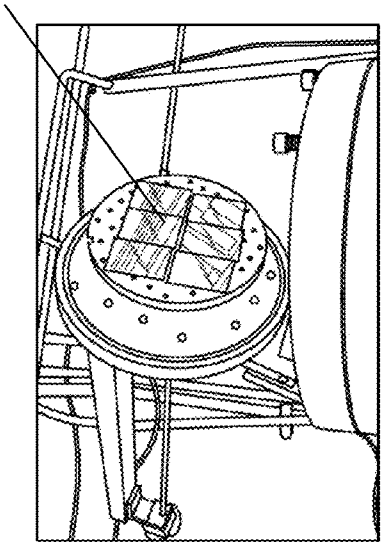
FIG. 28 depicts an example of electron beam evaporation for metal deposition, in accordance with some example embodiments.
Figure 28:
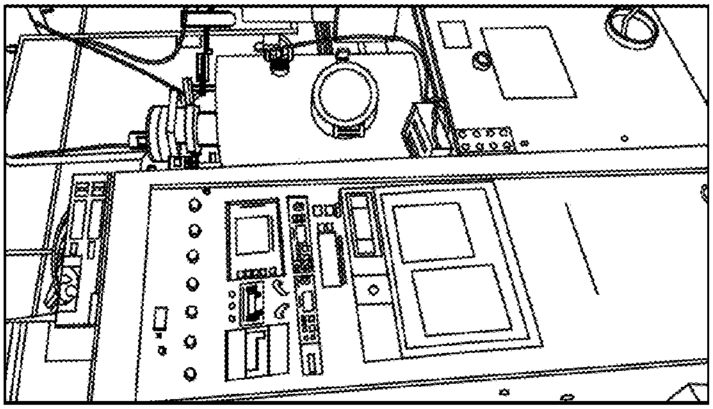

In some example embodiments, the radio frequency trace 2520, the direct current bias line 2530, and the ground 2550 may be formed through metal deposition. For example, as shown in FIG. 28, the radio frequency trace 2520, the direct current bias line 2530, and the ground 2550 may be formed through electron beam evaporation in which an electron beam evaporates the metal (e.g., the titanium gold alloy) for deposition on the targeted wafer. Moreover, according to some example embodiments, the electromagnetic wave manipulation apparatus 2500 may be fabricated through maskless lithography, which obviates the need for creating new masks each time the layout electromagnetic wave manipulation apparatus 2500 is changed.

Figure 27A:
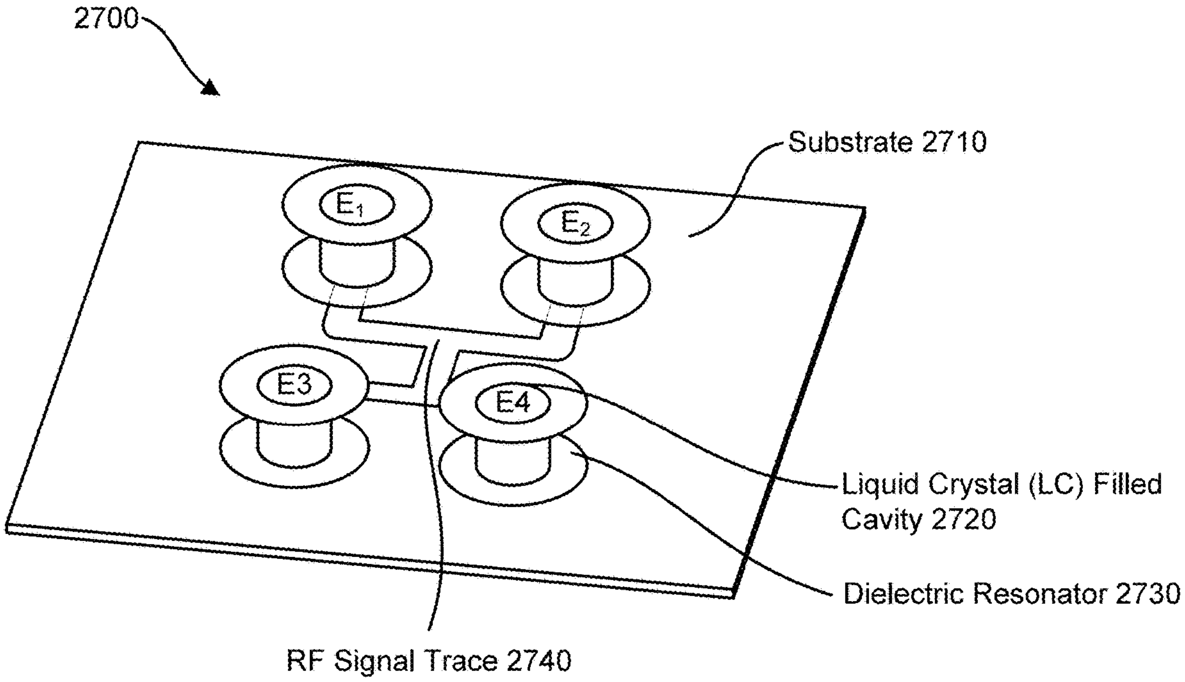
FIGS. 27A-B depict another example of an electromagnetic wave manipulation apparatus, in accordance with some example embodiments.
Figure 27B:
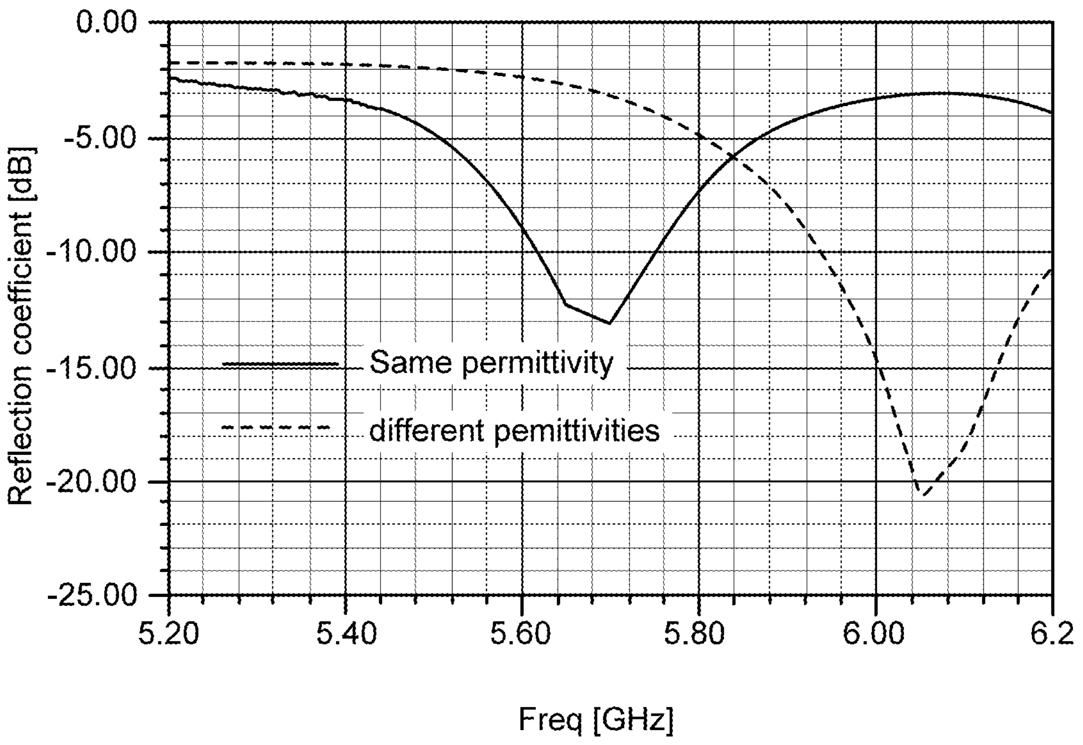

FIGS. 27A-B depict another example of an electromagnetic wave manipulation apparatus 2700, in accordance with some example embodiments. As shown in FIG. 27A, the electromagnetic wave manipulation apparatus 2700 may include a substrate 2710 having one or more dielectric resonators. In the example shown in FIG. 27A, each dielectric resonator may include a liquid crystal filled cavity. The permittivity of the liquid crystal filled cavities $\epsilon_1$, $\epsilon_2$, $\epsilon_3$, and $\epsilon_4$ may changed by subjecting each liquid crystal filled cavity to a voltage bias. Changing the permittivity of the liquid crystal filled cavities also changes the frequency of the electromagnetic wave manipulation apparatus 2700. The frequency reconfigurability of the electromagnetic wave manipulation apparatus 2700 is shown in FIG. 27B, which depicts a graph illustrating the relationship between the reflection coefficient of the surface of the electromagnetic wave manipulation apparatus 2700 and corresponding frequency of the electromagnetic wave manipulation apparatus 2700.

In some example embodiments, the electromagnetic wave manipulation apparatuses described herein be deployed for a variety of applications. Devices that communicate wirelessly indoors and outdoors often suffer from poor connectivity issues arising from a variety of causes including, for example, a lack of direct data paths from the access point (AP) to the user equipment (UE), a crowded spectrum due to numerous devices operating simultaneously, and/or. One example application for the electromagnetic wave manipulation apparatuses described herein is to act as a reconfigurable smart surface capable of retransmitting an attenuated signal from an access point with gain and/or constructively adding the attenuated signals received at the user equipment. The electromagnetic wave manipulation apparatuses may act passively to perform various electromagnetic wave transformations such as reflection, absorption, polarization mode conversion, transmission, and/or the like. That is, the electromagnetic wave manipulation apparatuses described herein may achieve the necessary field offset without an input radio frequency (RF) excitation.

Figure 13A:
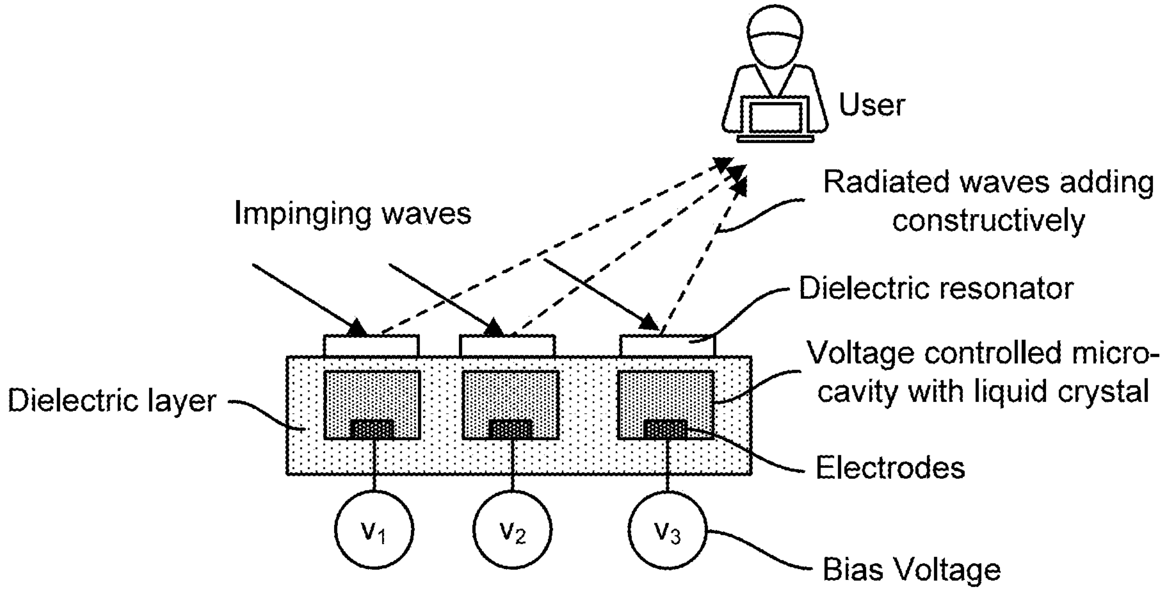
FIGS. 13A-C depict various examples of applications for a liquid crystal based smart surface, in accordance with some example embodiments.
Figure 13B:
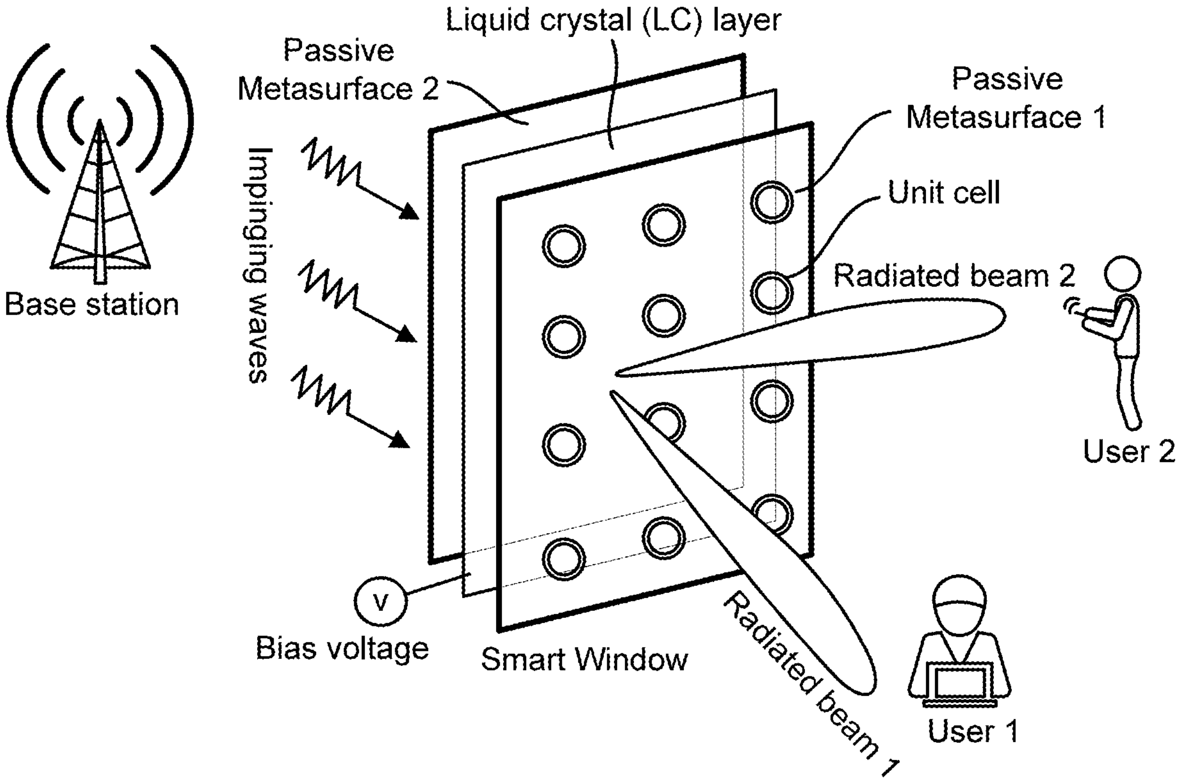
Figure 13C:
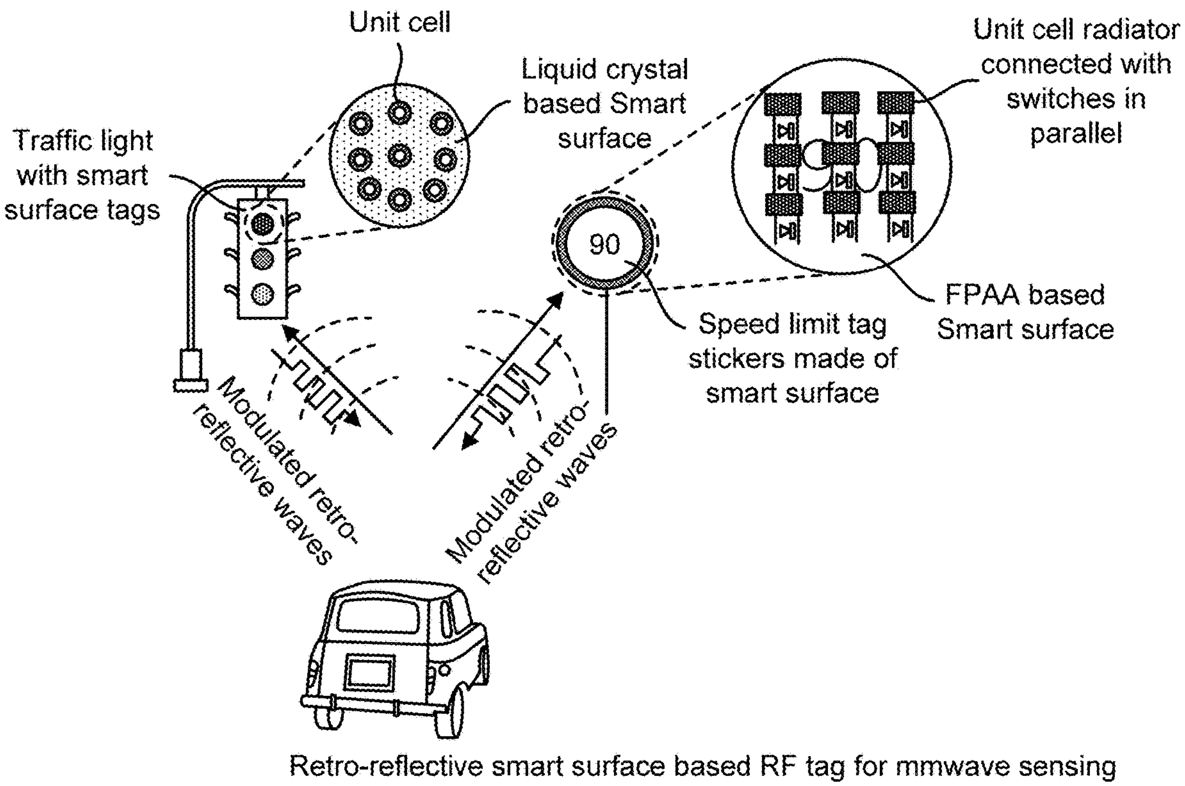

FIGS. 13A-C depict some example applications of the electromagnetic wave manipulation apparatuses described herein, which may be integrated in a variety of surfaces such as walls (or wallpaper), window panels, tiles (or tile coatings) for interior and/or exterior use, street signs, traffic lights, and/or the like. For example, FIG. 13A shows that when an electromagnetic wave manipulation apparatus is integrated in a wall, the electromagnetic wave manipulation apparatus may reflect the scattered waves towards one or more user devices for optimum link performance. When used as a window panel, as shown in FIG. 13B, the electromagnetic wave manipulation apparatus may accumulate and refract electromagnetic waves constructively originating from a source such as a base station towards one or more user devices. Alternatively and/or additionally, FIG. 13C shows the electromagnetic wave manipulation apparatus being integrated in a street-sign for outdoor communication. For instance, as shown in FIG. 13C, the electromagnetic wave manipulation apparatus integrated in the street sign may retro-reflect a signal back towards its source such as a radar used in a vehicle. The retro-reflectivity of the electromagnetic wave manipulation apparatus may also be exploited for use as smart tags in a commercial product inventory management system.

Figure 14:
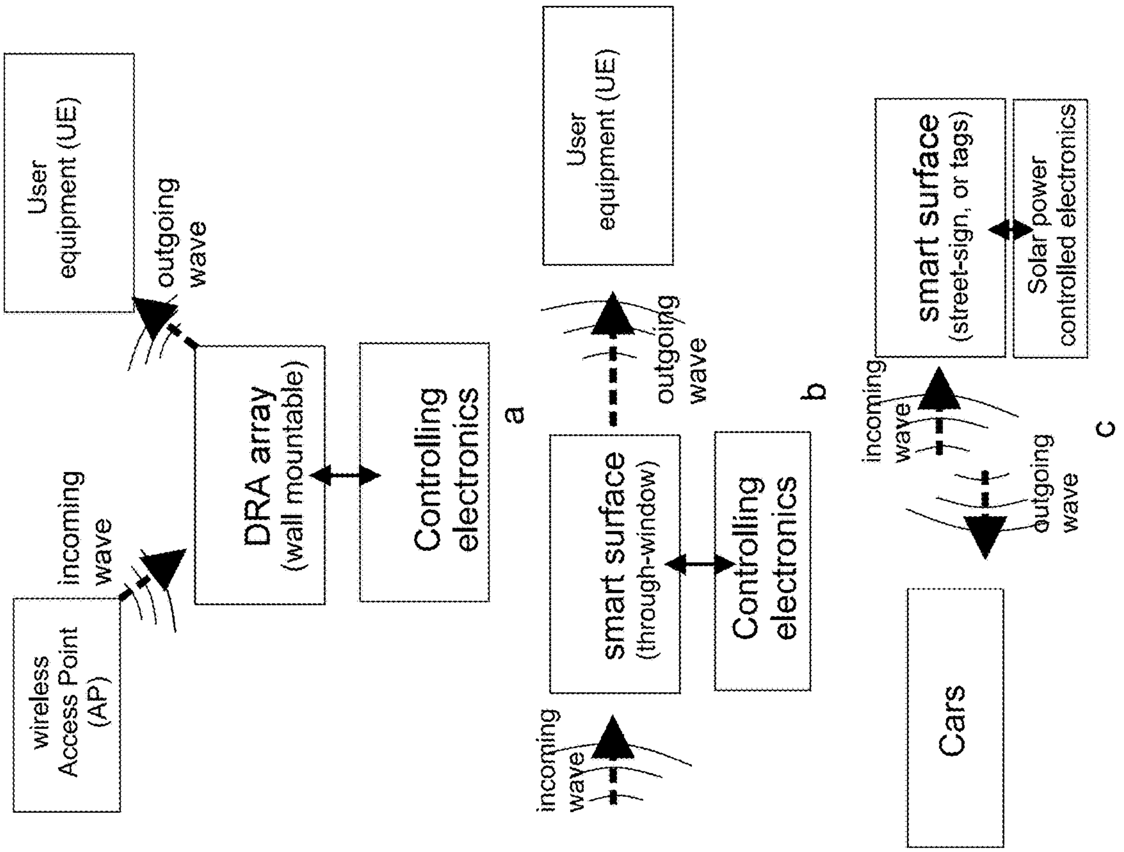
FIG. 14 depicts block diagrams illustrating examples of various systems integrating an electromagnetic wave manipulation apparatus, in accordance with some example embodiments.

FIG. 14 depicts block diagrams illustrating examples of various systems integrating an electromagnetic wave manipulation apparatus, in accordance with some example embodiments. In FIG. 14(*a*), the liquid crystal based dielectric apparatus may be a dielectric resonator antenna (DRA) array that pairs with a wireless access point (AP) to constructively reflect signals at a user equipment (UE) for better link performance in indoor (or outdoor) communication scenarios. In FIG. 14(*b*), the liquid crystal based dielectric apparatus may be a smart surface having one or more metasurfaces configured to increase the link performance by focusing multiple signals at the user equipment (UE) through refraction. This system, which may be energized by solar power, may be deployed as a window panel such as shown in FIG. 13B. FIG. 14(*c*) shows the liquid crystal based dielectric apparatus being a smart surface used as a retro-reflective street sign that utilizes solar energy to its power control electronics. In some applications, such as the retro-reflective street sign, the liquid crystal based dielectric apparatus may be further configured to perform back-scatter modulation to encode data in the retro-reflected signal.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus configured to generate an output electromagnetic wave responsive to an impinging electromagnetic wave, the apparatus comprising:

a substrate; and a liquid crystal (LC) integrated with the substrate, the liquid crystal exhibiting a first dielectric constant when subjected to a first voltage bias, the first dielectric constant of the liquid crystal transforming the impinging electromagnetic wave such that the output electromagnetic wave of the apparatus includes a first electromagnetic (EM) wave having a first field offset relative to the impinging electromagnetic wave impinging on a surface of the apparatus that corresponds to the first dielectric constant, and such that the output electromagnetic wave is modulated to encode data by at least varying the first field offset exhibited by the first electromagnetic wave.

2. The apparatus of claim 1, wherein the first voltage bias comprises a fixed voltage, a variable voltage, or a zero voltage.

3. The apparatus of claim 1, wherein the first field offset is configurable by varying one or more of a thickness of the substrate, a thickness of the liquid crystal, a size of a radiator included in the apparatus, and/or a shape of the radiator.

4. The apparatus of claim 1, wherein the apparatus comprises one or more unit cells, and wherein each unit cell comprises a radiator and/or a cavity in the substrate filled with the liquid crystal.

5. The apparatus of claim 4, wherein the apparatus includes a first unit cell and a second unit cell, wherein the first unit cell is subjected to the first voltage bias such that the liquid crystal comprising the first unit cell exhibits the first dielectric constant, wherein the second unit cell is subjected to a second voltage bias such that the liquid crystal comprising the second unit cell exhibits a second dielectric constant, and wherein the impinging electromagnetic wave is further transformed by the output electromagnetic wave of the apparatus including a second electromagnetic wave having a second field offset relative to the impinging electromagnetic wave that corresponds to the second dielectric constant.

6. The apparatus of claim 5, wherein the apparatus beam steers the output electromagnetic wave through a constructive interference and/or a destructive interference between the first electromagnetic wave and the second electromagnetic wave, and wherein the beam steering includes changing a direction, a phase, and/or a polarization of the output electromagnetic wave.

7. The apparatus of claim 1, wherein the first field offset exhibited by the first electromagnetic wave is configurable by varying the first voltage bias.

8. The apparatus of claim 1, wherein the first field offset includes a change in a phase, an amplitude, a polarization, a delay, and/or a frequency of the impinging electromagnetic wave.

9. The apparatus of claim 1, wherein the first voltage bias changes a permittivity of the liquid crystal to enable the apparatus to reflect, refract, retro-reflect, transmit, absorb, and/or polarize the impinging electromagnetic wave.

10. The apparatus of claim 1, further comprising one or more of an electrode, a radio frequency (RF) trace, a direct current (DC) bias line, and a radiator.

11. The apparatus of claim 1, wherein the liquid crystal comprises one or more of a quartz, a twisted nematic liquid crystal, and a liquid crystal polymer.

12. The apparatus of claim 1, wherein the substrate comprises a dielectric material.

13. An apparatus configured to generate an output electromagnetic wave responsive to an impinging electromagnetic wave, the apparatus comprising:

a plurality of radiators; and a plurality of switches, wherein each radiator of the plurality of radiators is coupled with a switch from the plurality of switches, wherein biasing a first switch of the plurality of switches transforms the impinging electromagnetic wave by at least causing a first radiator coupled with the first switch to output a first electromagnetic wave having a first field offset relative to the impinging electromagnetic wave impinging on a surface of the apparatus, such that the output electromagnetic wave is modulated to encode data by at least varying the first field offset exhibited by the first electromagnetic wave, and wherein the output electromagnetic wave of the apparatus includes the first electromagnetic wave output by the first radiator.

14. The apparatus of claim 13, wherein biasing a second switch of the plurality of switches causes a second radiator coupled with the second switch to output a second electromagnetic wave having a second field offset relative to the impinging electromagnetic wave impinging on the surface of the apparatus, and wherein the output electromagnetic wave of the apparatus further includes the second electromagnetic wave output by the second radiator.

15. The apparatus of claim 14, wherein the apparatus beam steers the output electromagnetic wave through a constructive interference and/or a destructive interference between the first electromagnetic wave and the second electromagnetic wave, and wherein the beam steering includes changing a direction, a phase, and/or a polarization of the output electromagnetic wave.

16. The apparatus of claim 14, wherein the first radiator and the second radiator are connected in parallel by the biasing of the first switch and the second switch.

17. The apparatus of claim 13, wherein an operating frequency of the apparatus corresponds to a quantity of the plurality of radiators connected in parallel by biasing a corresponding plurality of switches, and wherein a reflection coefficient and a transmission phase of the apparatus correspond to the operating frequency of the apparatus.

18. The apparatus of claim 13, wherein the plurality of switches include one or more of a varactor and a liquid crystal.

* * * * *